United States Patent
Horowitz et al.

(10) Patent No.: US 11,768,885 B2
(45) Date of Patent: *Sep. 26, 2023

(54) SYSTEMS AND METHODS FOR MANAGING TRANSACTIONAL OPERATION

(71) Applicant: MongoDB, Inc., New York, NY (US)

(72) Inventors: Eliot Horowitz, New York, NY (US); Andrew Michalski Schwerin, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,090

(22) Filed: Aug. 17, 2022

(65) Prior Publication Data

US 2022/0405330 A1 Dec. 22, 2022

Related U.S. Application Data

(63) Continuation of application No. 16/442,204, filed on Jun. 14, 2019, now Pat. No. 11,429,675.

(60) Provisional application No. 62/690,853, filed on Jun. 27, 2018, provisional application No. 62/690,213, filed on Jun. 26, 2018, provisional application No. 62/687,611, filed on Jun. 20, 2018.

(51) Int. Cl.
*G06F 16/93* (2019.01)
*G06F 16/178* (2019.01)

(52) U.S. Cl.
CPC .......... *G06F 16/93* (2019.01); *G06F 16/178* (2019.01)

(58) Field of Classification Search
CPC .............................. G06F 16/93; G06F 16/178
See application file for complete search history.

(56) References Cited

U.S. PATENT DOCUMENTS

| | | | |
|---|---|---|---|
| 5,287,501 A | | 2/1994 | Lomet |
| 6,529,909 B1 | * | 3/2003 | Bowman-Amuah ....................... G06F 16/258 |
| 6,785,696 B2 | | 8/2004 | Mosher et al. |
| 8,078,639 B2 | | 12/2011 | Christiansen et al. |
| 10,048,983 B2 | | 8/2018 | Jenkinson et al. |
| 10,452,497 B2 | | 10/2019 | Straub et al. |
| 10,621,574 B1 | * | 4/2020 | Rao ....................... G06Q 20/363 |
| 10,817,312 B2 | | 10/2020 | Shukla et al. |
| 10,825,028 B1 | * | 11/2020 | Kramme .............. G06Q 20/401 |
| 11,429,675 B2 | | 8/2022 | Horowitz et al. |

(Continued)

*Primary Examiner* — Merilyn P Nguyen
(74) *Attorney, Agent, or Firm* — Wolf, Greenfield & Sacks, P.C.

(57) ABSTRACT

Described herein are embodiments of a database system for performing multi-document transactions. The database system comprises a database comprising a plurality of data storage nodes. The database system receives transactions that access at least two documents stored in the database. The database system generates a transaction identifier associated with the transaction and associates operations in the transaction with the transaction identifier. The database system performs at least part of the transaction on the database and determines whether an error occurred in performing in performing the transaction. When the database system determines that an error occurred in performing the transaction, the database system reverses any performed operations of the transaction. When no error occurs in performing the transaction, the database system outputs a confirmation.

20 Claims, 17 Drawing Sheets

(56) References Cited

U.S. PATENT DOCUMENTS

| | | | |
|---|---|---|---|
| 2006/0149671 A1* | 7/2006 | Nix | G06Q 20/102 |
| | | | 705/40 |
| 2008/0215528 A1 | 9/2008 | Sedler | |
| 2008/0249988 A1 | 10/2008 | Chaitanya et al. | |
| 2012/0030247 A1 | 2/2012 | Yambal et al. | |
| 2012/0158540 A1* | 6/2012 | Ganti | G06Q 30/0185 |
| | | | 705/26.35 |
| 2012/0166390 A1 | 6/2012 | Merriman et al. | |
| 2013/0290249 A1 | 10/2013 | Merriman et al. | |
| 2017/0364450 A1 | 12/2017 | Struttmann | |
| 2018/0068130 A1* | 3/2018 | Chan | G06F 21/64 |
| 2018/0121673 A1 | 5/2018 | Goldfarb et al. | |
| 2018/0276269 A1* | 9/2018 | Rasscevskis | G06F 16/273 |
| 2019/0392006 A1 | 12/2019 | Horowitz et al. | |

\* cited by examiner

```
with client.start_session() as s:          ─ 801
    s.start_transaction()        ─ 802
    collection_one.insert_one(doc_one, session=s)    ─ 804
    collection_two.insert_one(doc_two, session=s)    ─ 806
    s.commit_transaction()
                         ─ 808
```

FIG. 8A

```
try (ClientSession clientSession = client.startSession()) {    ─ 811
    clientSession.startTransaction();    ─ 812
    collection.insertOne(clientSession, docOne);    ─ 813
    collection.insertOne(clientSession, docTwo);    ─ 814
    clientSession.commitTransaction();    ─ 816
}
```

FIG. 8B

```
s.start_transaction()    ─ 822
    orders.insert_one(order, session=s)    ─ 824
    stock.update_one(item, stockUpdate, session=s)    ─ 826
s.commit_transaction()    ─ 828
```

FIG. 8C

```
with client.start_session() as s:          ← 832
    s.start_transaction():          ← 834
        try:
            collection.insert_one(doc1, session=s)    ← 834A
            collection.insert_one(doc2, session=2)    ← 834B
        except:    ← 836
            s.abort_transaction()    ← 836A
            raise
        s.commit_transaction()    ← 838
```

FIG. 8D

```
// Runs the txnFunc and retries if TransientTransactionError encountered
function runTransactionWithRetry(txnFunc, session) {  ← 1302
    while (true) {
        try {                                         ← 1304
            txnFunc(session);  // performs transaction
            break;
        } catch (error) {  ← 1306
            // If transient error, retry the whole transaction
            if ( error.hasOwnProperty("errorLabels") && error.errorLabels.includes(  ← 1306A
                    "TransientTransactionError") ) {
                print("TransientTransactionError, retrying transaction ...");  ← 1306B
                continue;  ← 1306C
            } else {  ← 1308
                print("Transaction aborted. Caught exception during transaction.");  ← 1308A
                throw error;  ← 1308B
            }
        }
    }
}
```

```
// Retries commit if UnknownTransactionCommitResult encountered function commitWithRetry(session) {  // ← 1312
    while (true) {
        try {                                                          // ← 1314
            session.commitTransaction(); // Uses write concern set at transaction start.
            print("Transaction committed.");
            break;
        } catch (error) {  // ← 1316
            // Can retry commit                                        // ← 1316A
            if (error.hasOwnProperty("errorLabels") && error.errorLabels.includes(
                            "UnknownTransactionCommitResult") ) {
                print("UnknownTransactionCommitResult, retrying commit operation ...");
                continue;  // ← 1316C                                  // ← 1316B
            } else {  // ← 1318
                print("Error during commit ...");  // ← 1318A
                throw error;  // ← 1318B
            }
        }
    }
}
```

```
// Updates two collections in a transactions                                    ← 1320 function updateEmployeeInfo(session) {    ← 1322
    employeesCollection = session.getDatabase("hr").employees;    ← 1322A
    eventsCollection = session.getDatabase("reporting").events;   ← 1322B
                                                                              ← 1322C
    session.startTransaction( { readConcern: { level: "snapshot" }, writeConcern: { w: "majority" } } );

try{
        employeesCollection.updateOne( { employee: 3 }, { $set: { status: "Inactive" } } );   ← 1322D
        eventsCollection.insertOne( { employee: 3, status: { new: "Inactive", old: "Active" } } );   ← 1322E
    } catch (error) {
        print("Caught exception during transaction, aborting.");   ← 1322F
        session.abortTransaction();   ← 1322G
        throw error;   ← 1322H
    } commitWithRetry(session);   ← 1322I
}

// Start a session.
session = db.getMongo().startSession( { readPreference: { mode: "primary" } } );   ← 1324 try{
    runTransactionWithRetry(updateEmployeeInfo, session);   ← 1326
} catch (error) {
    executeErrorRoutine()   ← 1328
} finally {
    session.endSession();   ← 1330
}
```

FIG. 13C

SYSTEMS AND METHODS FOR MANAGING TRANSACTIONAL OPERATION

RELATED APPLICATIONS

This Application is a continuation claiming the benefit of U.S. application Ser. No. 16/442,204, now issued as U.S. Pat. No. 11,429,675, filed Jun. 14, 2019, and entitled "SYSTEMS AND METHODS FOR MANAGING TRANSACTIONAL OPERATION", which is hereby incorporated herein by reference in its entirety. Application Ser. No. 16/442,204 claims the benefit under 35 U.S.C. § 119(e) of U.S. Provisional Application Ser. No. 62/690,853, filed Jun. 27, 2018, and entitled "SYSTEMS AND METHODS FOR MANAGING TRANSACTIONAL OPERATION WITH DYNAMIC SCHEMA", which is hereby incorporated herein by reference in its entirety. Application Ser. No. 16/442,204 claims the benefit under 35 U.S.C. § 119(e) of U.S. Provisional Application Ser. No. 62/690,213, filed Jun. 26, 2018, and entitled "SYSTEMS AND METHODS FOR MANAGING TRANSACTIONAL OPERATION WITH DYNAMIC SCHEMA", which is hereby incorporated herein by reference in its entirety. Application Ser. No. 16/442,204 claims the benefit under 35 U.S.C. § 119(e) of U.S. Provisional Application Ser. No. 62/687,611, filed Jun. 20, 2018, and entitled "SYSTEMS AND METHODS FOR MANAGING TRANSACTIONAL OPERATION", which is hereby incorporated herein by reference in its entirety.

BACKGROUND

Databases may include multiple disks to store redundant data. The redundant storage of data in multiple disks may improve the rate at which data can be read from the database by spreading out read requests over multiple disks or systems. Further, the redundant storage of data may improve uptime of the database by making the database more robust to failures.

SUMMARY

According to at least one aspect, a database system is provided. The database system comprises a database comprising a plurality of data storage nodes, at least one processor configured to execute a plurality of system components. The system components comprise: an interface component configured to receive at least one transaction configured to access at least two documents stored in the database and comprising at least one operation, a transaction identification component configured to generate a transaction identifier associated with the transaction, and a transaction processing component configured to: associate the at least one operation in the transaction with the transaction identifier; perform at least part of the transaction on the database; determine whether an error occurred in performing the at least part of the transaction; responsive to determining that the error occurred in performing the at least part of the transaction, reverse a performed operation associated with the transaction using the transaction identifier; and responsive to determining that the error did not occur in performing the at least part of the transaction, output a confirmation.

In some embodiments, the at least one processor comprises a plurality of processors including a first processor configured to execute the transaction identification component and a second processor configured to execute the transactions processing component. In some embodiments, the transaction identification component is configured to transmit the at least one operation and the transaction identifier to the second processor.

In some embodiments, the transaction processing component is configured to perform at least part of the transaction at least in part by performing at least part of the at least one operation on a primary storage node of the plurality of storage nodes and triggering at least one secondary storage node of the plurality of storage nodes to replicate the at least part of the at least one operation.

In some embodiments, the transaction processing component is configured to associate the at least one operation with the transaction identifier at least in part by storing a relationship between each of the at least on operation and the transaction identifier in a table. In some embodiments, storing the relationship comprises storing the table in at least one storage node of the plurality of storage nodes. In some embodiments, the transaction processing component is configured to reverse the performed operation at least in part by identifying an operation using the table and reversing the identified operation.

In some embodiments, the transaction processing component is configured to determine whether the error occurred in performing at least part of the transaction comprises determining whether the transaction ends with a commit operation to replicate the at least on operation in the transaction from a first storage node in the plurality of storage nodes to at least one other storage node in the plurality of storage nodes.

In some embodiments, the transaction processing component is configured to determine whether the error occurred in performing at least part of the transaction comprises determining whether an error occurred in performing an operation in the at least one operation for the transaction.

In some embodiments, the database follows an eventual consistency model. In some embodiments, the plurality of data storage nodes comprises a primary storage node including an operation log and at least one secondary data storage node configured to retrieve the operation log and replicate operations in the operation log. In some embodiments, the transaction processing component is configured to perform at least part of the transaction at least in part by writing at least part of the at least one operation to the operation log.

According to at least one aspect, a method of performing operations in a database comprising a plurality of storage nodes is provided. The method comprises receiving, by an interface component executed by at least one processor, at least one transaction configured to access at least two documents stored in the database and comprising at least one operation; generating, by a transaction identification component executed by the at least one processor, a transaction identifier associated with the transaction; associating, by a transaction processing component executed by the at least one processor, the at least one operation in the transaction with the transaction identifier; performing, by the transaction processing component, at least part of the transaction on the database; determining, by the transaction processing component, whether an error occurred in performing the at least part of the transaction; reversing, by the transaction processing component, a performed operation associated with the transaction using the transaction identifier responsive to determining that the error occurred in performing the at least part of the transaction, reverse a performed operation associated with the transaction using the transaction identifier; and outputting, by the transaction processing component, a confirmation responsive to determining that the error did not occur in performing the at least part of the transaction, output a confirmation.

In some embodiments, the method further comprises performing the at least part of the transaction at least in part by performing at least part of the at least one operation on a primary storage node of the plurality of storage nodes and triggering at least one secondary node of the plurality of storage nodes to replicate the at least part of the at least one operation.

In some embodiments, the method further comprises associating the at least one operation with the transaction identifier at least in part by storing a relationship between each of the at least one operation and the transaction identifier in a table. In some embodiments, storing the relationship comprises storing the table in at least one storage node of the plurality of storage nodes. In some embodiments, the method further comprises reversing the performed operation at least in part by identifying an operation using the table and reversing the identified operation.

In some embodiments, determining whether the error occurred in performing the at least part of the transaction comprises determining whether the transaction ends with a commit operation to replicate the at least one operation in the transaction from a first storage node in the plurality of storage nodes to at least one other storage node in the plurality of storage nodes. In some embodiments, determining whether the error occurred in performing the at least part of the transaction comprises determining whether an error occurred in performing an operation in the at least one operation for the transaction.

According to at least one aspect, at least one non-transitory computer-readable storage medium storing instructions is provided. The instructions, when executed by a processor, cause the processor to perform acts of: receiving at least one transaction configured to access at least two documents stored in the database and comprising at least one operation; generating a transaction identifier associated with the transaction; associating the at least one operation in the transaction with the transaction identifier; performing at least part of the transaction on the database; determining whether an error occurred in performing the at least part of the transaction; reversing a performed operation associated with the transaction using the transaction identifier responsive to determining that the error occurred in performing the at least part of the transaction; and outputting a confirmation responsive to determining that the error did not occur in performing the at least part of the transaction, output a confirmation.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIGS. 8A-D each show an example of code for executing a multi-document transaction, according to some embodiments.

FIG. 13A is example code implementing a function to retry a transaction, according to some embodiments;

FIG. 13B is example code implementing a function to retry committing a transaction, according to some embodiments;

FIG. 13C is example code for performing a transaction employing the functions of FIGS. 13A-B, according to some embodiments.

DETAILED DESCRIPTION

Figure 1:
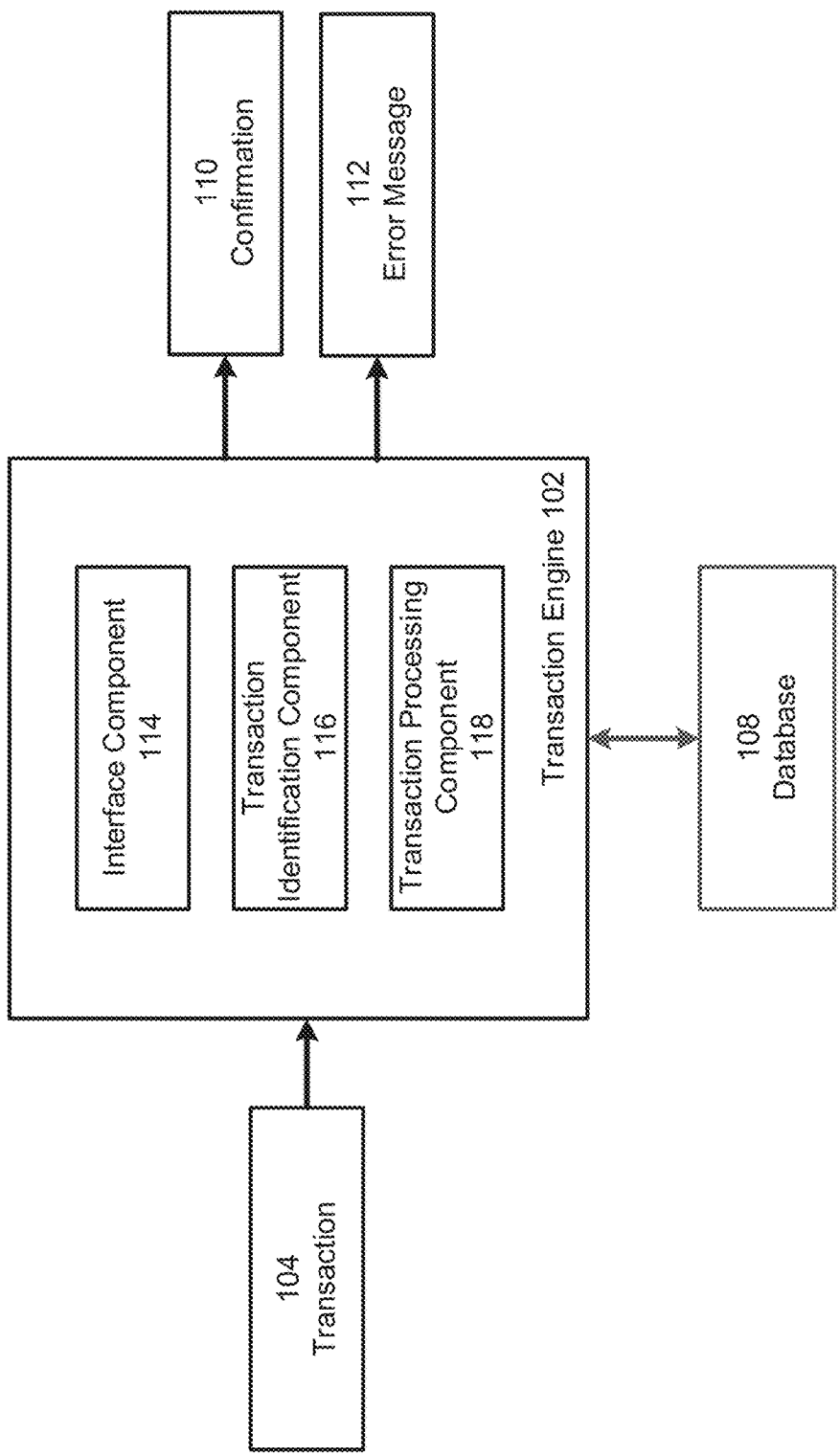
FIG. 1 illustrates a block diagram of an example transaction engine configured to process transactions, according to some embodiments.

According to one aspect, systems and methods are provided for processing transactions that access multiple data objects (e.g., documents) in a database, such as a database that employs a dynamic schema (e.g., a No-SQL database). These transactions may meet all or any portion of the ACID properties including (1) atomicity (e.g., a guarantee that all of a transaction happens, or none of it does), (2) consistency (e.g., a guarantee that the data will be consistent), (3) isolation (e.g., a guarantee that one transaction cannot read data from another transaction that is not yet completed), and (4) durability (e.g., a guarantee that the all of the changes in the transaction have been stored in a non-volatile memory).

Conventionally, ACID transactions (e.g., transactions with ACID properties) that span multiple data objects are limited to relational databases. In a relational database, an entity's data is typically stored across multiple records and parent-child tables each having defined structure and defined relationships. For example, the information for a contact in a customer database may span multiple tables including: (1) a customer table storing a name of the customer; (2) an address table storing the address of the customer; and (3) a phone number table storing the phone number of customer.

In the event that the customer data changes, multiple tables would need to be updated in an "all-or-nothing" transaction (e.g., an ACID transaction).

In contrast to relational databases, databases that employ a dynamic schema may store related data together in a hierarchical structure instead of spreading related data across multiple tables. Further, in dynamic schema architectures data units (e.g., documents) can contain complex data structures (e.g., arrays or nested arrays), and may include references to other data units. Conventionally, operations supported by a database with such dynamic schema can be constrained by the variability in the underlying data. For example, conventional operations may be limited to operations that execute on a single document or data contained in a single document as, generally, all of the related data is confined. To provide an analogy, database join operations are relatively straight forward when the data structure is constant and the relationship between joined tables defined by the join operation. Such consistency can be relied on in dynamic schema implementation.

For example, all of the information for a particular contact in a customer database may be stored in a single document. Thus, an operation targeting a single document may be capable of updating all of the contact information associated with the particular contact (even in dynamic schema settings).

The inventors have appreciated that particular use cases may arise in databases employing dynamic schema where updating data may be challenging without multi-document transactions. Transaction in this sense is used to connote an operation or set of operations that are executed in an all or nothing manner—i.e. either all the operations execute or none of the operations affect the underlying data.

A multi-document transaction may also be referred to as a "distributed transaction". For example, updating a database storing bank account information to reflect movement of funds between bank accounts may require modification of a first document associated with a first bank account that is the source of the funds and modification of a second, different document associated with a second bank account that is the destination of the funds. In this example, the bank account balances could be incorrect if a portion of the operations to perform this movement of funds fail without the remainder of the operations being reversed. As another example, updating a database storing inventory information for a retailer along with an event log of changes in inventory may require modification of a first document storing inventory information for a product, and addition of a second document to an event log to record the change in inventory.

Accordingly, the inventors have devised new techniques to enable multi-document transactions (e.g., multi-document ACID transactions) in databases, such as databases with dynamic schema. Thus, database operations may be simplified in, for example, instances where the multiple documents are being modified together (e.g., to reflect funds shifting between accounts). As a result, the operation of the database is improved over conventional approaches. For example, because the capability of the database is expanded. Further, the new techniques described herein may result in a database that has all of the benefits of a dynamic schema, such as easy horizontal scaling, with at least some of the features otherwise only available in relational databases, such as multi-document transaction.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 shows an example transaction engine 102 according to some embodiments. The transaction engine 102 may be designed to process various received commands (e.g., transactions) on a database 108. The database 108 may employ a dynamic schema and/or follow an eventual consistency model. In some embodiments, the database 108 may include a plurality of nodes and replicate data from primary node to one or more secondary nodes. In these embodiments, the primary node may handle commands that change the data stored in the database 108 and the secondary nodes may replicate the data in the primary node over time and process read requests. Thereby, the secondary nodes may have data that is not completely up-to-date relative to the primary nodes. Example database systems are described herein.

In some embodiments, the transaction engine 102 receives and processes transactions 104. The transactions 104 may be, for example, configured to access a plurality of documents from the database 108 and comprise a set of one or more operations (e.g., write operations, write commit operations, read operations, and read commit operations, etc.). The transaction engine 102 may process a transaction 104 by generating an identifier for the transaction that may be associated with each of the operations in the transaction. The association between the identifier for a transaction and the operations in the transaction may be stored (e.g., in a table) and employed to keep track of which operations originated from which transactions to facilitate a roll-back of one or more operations in the transaction when necessary (e.g., because an operation in the transaction failed). As a result, the transaction engine 102 may be able to accurately track and process a set of operations in a transaction that includes any number of operations and span any number of documents.

As shown in FIG. 1, the transaction engine 102 includes an interface component 114. The interface component 114 can be configured to receive and provide data to various systems, such as the database 108. In some embodiments, the interface component 114 receives the transaction 104 and provides a confirmation 110 if the transaction is processed successfully or an error message 112 if the transaction fails to be processed successfully. The error message 112 may comprise information indicative of the particular error that occurred. For example, the error message 112 may include information indicative of the particular operation(s) that failed.

In some embodiments, the interface component 114 can be configured to provide a communicative interface with one or more systems separate from the transaction engine 102. The interface component 114 can be configured to communicate with an application executing on a computer system separate from the transaction engine 102. As an example, the interface component 1104 may communicate with an e-commerce web site, a banking application, or other application. The interface component 114 can be configured to receive the transaction 104 submitted by the system(s). For example, the interface component 114 may receive transactions from a banking application including operations to execute a transfer of funds from a first bank account to a second bank account. As another example, the interface component 114 may receive transactions from an e-commerce website including operations to execute for purchase orders. As yet another example, the interface component 114 may receive transactions from a phone company including operations to track customer calls.

In some embodiments, the interface component 114 can be configured to receive transactions via a session. A session may also be referred to as a "client session" or a "logical session". A session may establish a temporary information interchange between a client and the transaction engine 102. In some embodiments, a session may be a period during which a client is connected to the transaction engine 102 such that the client may submit transactions to the transaction engine 102. A session may be ended after a period of time. In some embodiments, the interface component 114 can be configured to end a session after a period of time (e.g., 1 minute, 15 minutes, 30 minutes, 1 hour, 1 day, 1 month, 1 year, or other time period). In some embodiments, the interface component 114 can be configured to end a session in response to a command from a client. In some embodiments, the interface component 114 can be configured to end a session in response to detection of a failure. For example, the interface component 114 may end a session if the transaction engine 102 is unable to connect to the database 108. In some embodiments, a client may initiate a session in which the transaction engine 102 may receive one or more transactions from the client. For example, a client may be an e-commerce site that initiates a session to submit transactions for one or more purchase orders performed on the e-commerce site. As another example, a client may be a banking system that initiates a session to submit transactions for one or more account transfers.

In some embodiments, the transaction engine 102 can be configured to use sessions to enable causal consistency of transactions. The transaction engine 102 can be configured to maintain an ordering of transactions that captures relationships among multiple transactions received during a session. The transaction engine 102 can be configured to use a session to ensure that transactions are executed in a proper order. For example, the transaction engine 102 may use a session to ensure that transactions are performed in an order in which they are received in time. In some embodiments, the transaction engine 102 can be configured to perform one transaction in a session at a time. For example, during a session the transaction engine 102 may receive multiple transactions from a client system including a first and a second transaction. In this example, the transaction engine 102 may: (1) perform the first transaction; and (2) after performing the first transaction, perform the second transaction. By performing transactions in sequence, the system may maintain an ordering of transactions that captures relationships among the transactions received during the session.

As shown in FIG. 1, the transaction engine 102 includes a transaction identification component 116 that is configured to generate identifier(s) for the transaction 104. The identifier(s) may be employed by the transaction engine 102 to, for example, track the operation(s) associated with the transaction 104 in the event any of the operation(s) need to be reversed (e.g., because of a failure of the transaction). In some embodiments, the identifier(s) for the transaction 104 may be a global unique identifier (GUID) generated using any of a variety of techniques. For example, the GUID may be created based on another unique identifier, such as a session identifier associated with a session on the client device from which the transaction originated. In this example, the GUID may be generated by adding a monotonically increasing number to the session identifier. In some embodiments, the transaction identification component 116 is configured to generate an identifier for each of multiple transactions received by the transaction engine 102. For example, the transaction identification component 116 may generate a transaction identifier of "1.1" for a first transaction, and generate a transaction identifier of "1.2" for a second transaction.

The transaction 104 may be processed by a transaction processing component 118 of the transaction engine 102. In some embodiments, the transaction processing component 118 may receive one or more operations in the transaction 104 and the identifier for the transaction 104 (e.g., generated by the transaction identification component 118). Upon receipt of the one or more operations and the identifier, the transaction processor component 118 may store the relationship between the one or more operations and the identifier (e.g., in a table) and attempt to perform the at least part of the transaction 104 (e.g., at least some of the one or more operations in the transaction). The transaction processing component 104 may determine whether an error occurred in performing at least part of the transaction 104, such as one or more operations failing. In some embodiments, if the transaction processing component 104 determines that an error occurred, the transaction processing component 104 may identify any operations in the same transaction using the identifier for the transaction and reverse the identified transactions. Thus, the data in the database 108 may be returned to its original state before any part of the transaction 104 was performed. In addition, the transaction processor component 118 may generate an error message 112 that may contain information indicative of the particular error that occurred, such as an indication of the particular operation that failed.

In some embodiments, if the transaction processing component 118 determines that an error occurred, the transaction processing component 118 may retry the transaction 104. For example, the transaction processing component 118 may re-execute one or more operations of the transaction 104. As another example, the transaction processing component 118 may retry to commit the transaction 104 to the database 108. If the transaction processing component 104 determines that an error has not occurred in performing the transaction 104, the transaction processing component 104 may generate a confirmation 110 indicating that the transaction 104 was processed successfully.

In some embodiments, the transaction processing component 118 can be configured to maintain atomicity of the transaction 104. The transaction processing component 118 can be configured to maintain atomicity of the transaction 104 by enforcing all-or-nothing execution of a transaction where the transaction processing component 118 requires execution of all operations of a transaction in order to complete the transaction. In these embodiments, if the transaction processing component 118 encounters an error during execution of any one of the operations, the transaction processing component 118 may abort the transaction. In some embodiments, the transaction processing component 118 can be configured to abort a transaction by reversing any executed operations to return data targeted by the transaction to a previous state. The transaction processing component 118 may return the data to a state as if the transaction had not been performed. For example, the transaction processing component 118 may return the data to its state in a snapshot before any updates of the transaction were applied to the data.

In some embodiments, the transaction processing component 118 can be configured to maintain atomicity of the transaction 104 by committing the transaction 104. In some embodiments, the transaction processing component 118 can be configured to commit the transaction 104 by saving all changes made to target data of the transaction 104 to the database 108. In some embodiments, the transaction processing component 118 can be configured to save the changes by transmitting the changes to one or more nodes of the database 108. For example, the transaction processing component 118 may submit one or more updates of the transaction 104 to a primary node of the database 108 which applies the changes to data hosted by the primary node. The primary node may then transmit a log of the operations to one or more secondary nodes which replicate the operation such that data hosted by each of the nodes is up to date with the changes from the transaction 104.

In some embodiments, the transaction processing component 118 can be configured to commit the transaction 104 by saving updates of the transaction to a threshold number of nodes of the database 108. In some embodiments, the threshold number of nodes may be a majority of nodes of the database. For example, the transaction processing component 118 may commit a transaction by applying updates from the transaction to the threshold number of nodes. In some embodiments, the transaction processing component 118 can be configured to determine that a transaction has been committed by confirming that the transaction has been applied at the threshold number of nodes. For example, the transaction processing component 118 may determine that at transaction has been committed after receiving messages from each of at least two out of three replica set members (e.g., nodes) indicating that the node has applied the transaction.

In some embodiments, the transaction processing component 118 can be configured to determine a state of data targeted by the transaction 104 prior to execution of any operation(s) of the transaction 104. If the transaction processing component 118 encounters an error in performing the transaction 104, the transaction processing component 118 may reverse any executed operations to return targeted data to the state. In some embodiments, the transaction engine 102 can be configured to generate and manage snapshots of data stored by the database 108. A snapshot may represent data that has been durably stored in the database 108 at a point in time. In some embodiments, a snapshot may represent data that has been replicated to a threshold number (e.g., majority) of nodes of the database 108 at a point in time. In some embodiments, the transaction engine 102 can be configured to generate and manage snapshots as described in U.S. patent application Ser. No. 15/605,141, entitled "METHOD AND APPARATUS FOR READING AND WRITING COMMITTED DATA", filed on May 25, 2017, and which is incorporated herein by reference in its entirety. The transaction processing component 118 can be configured to perform operations on target data stored in a snapshot. If the transaction processing component 118 detects a failure, the transaction processing component 118 may reverse the operations to return the target data as it was in the snapshot.

It should be appreciated that, in some embodiments, the components within the transaction engine 102 may be executed on different processors and/or different computing devices. Executing the components in such a fashion may advantageously reduce the execution time to process a transaction. For example, the transaction component 118 and/or the interface component 114 may be executed on a first processor (e.g., in a client device) and the transaction processing component 118 may be executed on a second processor (e.g., in a server) that is in communication with the first processor. Thus, the more computationally intensive activity of generating the identifier for a transaction is distributed amongst all of the client devices in communication with the server (instead of centralized at the server and creating a bottleneck).

Example Database Systems

Figure 2:
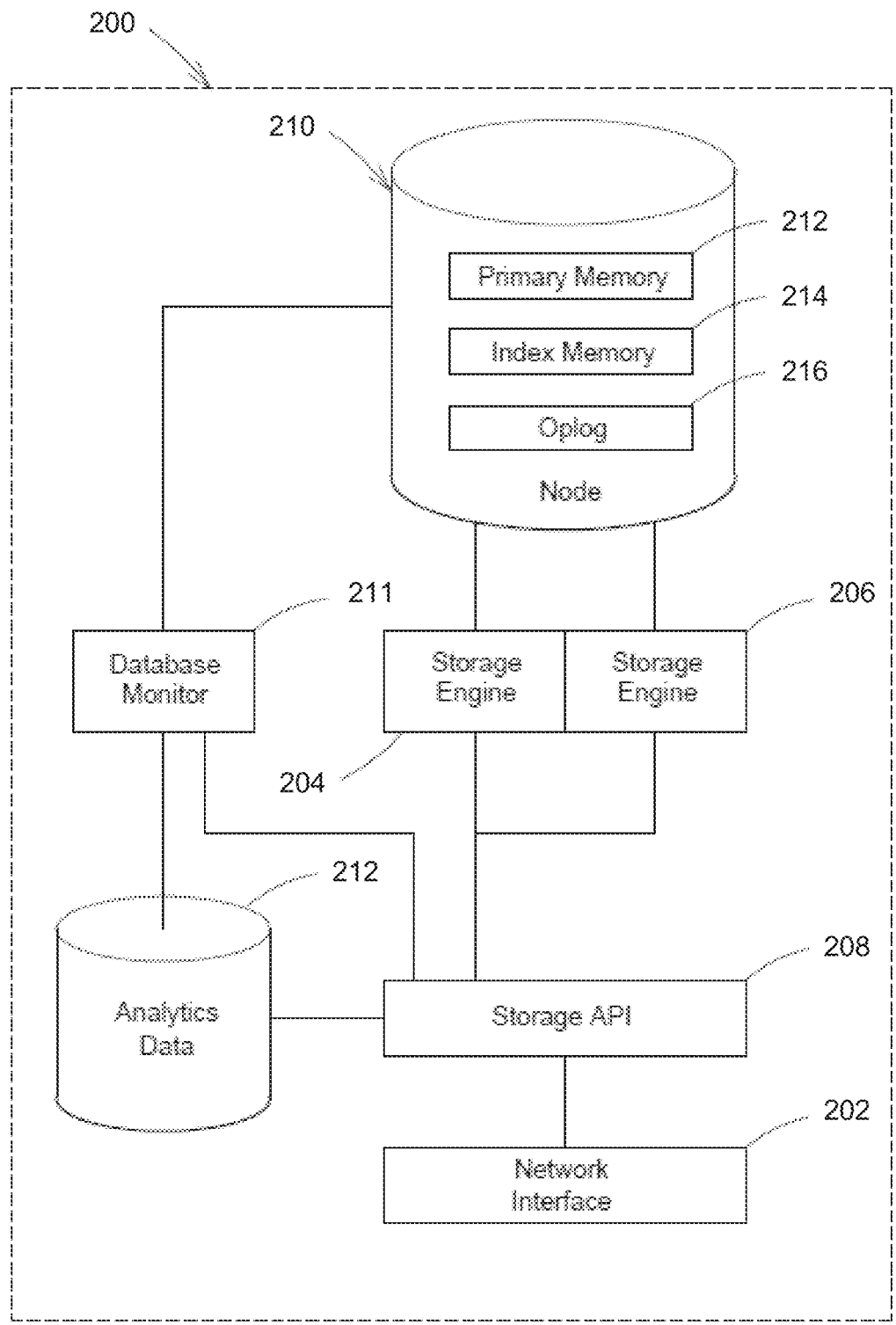
FIG. 2 illustrates a block diagram of an example distributed database system, according to some embodiments.

FIG. 2 shows an example of a database subsystem 200, according to some embodiments. The database subsystem 200 includes an interface 202 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, entitled "METHOD AND APPARATUS FOR MAINTAINING REPLICA SETS", filed on Dec. 23, 2010, the disclosure of which is hereby incorporated by reference in its entirety. The database subsystem 200 includes a storage application. In one implementation described in greater detail below, a base unit of data is a document.

In some embodiments, the database subsystem 200 may be a part of database 108 described above with reference to FIG. 1. In some embodiments, the transaction engine 102 may be a component of the database subsystem 200. For example, the transaction engine 102 may receive and process transactions submitted by a client to the database subsystem 200.

In some embodiments, a document can be configured to store data in a hierarchical structure. A document may include other data structures within the document. For example, a document may include one or more subdocuments, arrays, lists, linked lists, stacks, queues, and/or other data structures. In some embodiments, a document can be configured to include one or more fields and values for each of the field(s). In some embodiments, a document can be configured to store related data. For example, a single document may store all data related to a particular customer, an account holder, and/or other entity. In some embodiments, one or multiple fields in a document may be accessed in a single operation. For example, a write operation may update one or more fields of a document. In some embodiments, write operations may update one or more data structures stored in the document. For example, a write operation may update an element of an array, and/or updates to subdocuments stored in the document.

Figure 12:
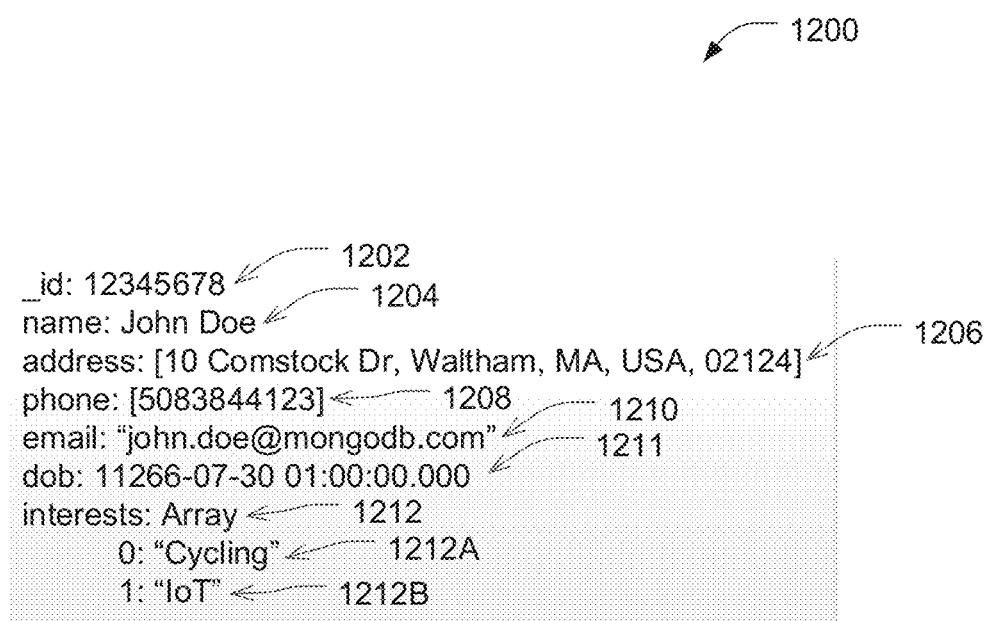
FIG. 12 is an example of a document, according to some embodiments.

FIG. 12 shows an example document 1200, according to some embodiments. The document 1200 includes multiple fields 1202-1212 and associated values. The document 1200 includes an identifier field 1202 storing a unique identifier for the document. The document 1200 includes a name field 1204 storing a name of a person for whom the document stores data. The document 1200 includes an address field 1206 that stores an address of the person. As illustrated in FIG. 12, the address may be stored as an array data structure. For example, the address field 1206 may store specifying a number, street, city, state, country, and/or zip code of an address in an array. The document 1200 includes a phone field 1208 storing a phone number of the person in an array structure. The document 1200 includes an email field 1210 which stores an email of the person as a string. The document 1200 includes a date of birth field 1211 storing the person's date of birth as a date and time. The document 1200 includes an interests field 1212 storing the person's interests as an array. As illustrated in FIG. 12, the array includes a first entry 1212A for cycling, and a second entry 1212B for Internet of things (IoT).

It should be appreciated that documents are not limited to any particular fields or data structures described herein. Examples described herein are for illustrative purposes. In some embodiments, a document can be configured to store fields and/or data structures in addition and/or instead of those described herein.

In some embodiments, a storage application programming interface (API) 208 receives database requests, including requests to perform transactions and/or read and write operations. When a write operation is requested, the storage API 208 in response selectively triggers a first storage engine 204 or a second storage engine 206 configured to store data in a first data format or second data format, respectively, in node 210. As discussed in more detail below, a database monitor 211 may track a number of analytics about the database. In some embodiments, the database monitor 211 is configured to track the operations performed on the data over time, and stores that information as analytics data 213. In some examples, analytic data may be stored in a separate database. In other examples, the analytics data is stored as a name collection (i.e., a logical grouping of data). These analytics may be provided to the storage API 208, which relies on the analytics to selectively actuate an appropriate storage engine.

In one example, the database monitor 211 tracks the relative number of read and write operations performed on a collection within the database. In another example, the database monitor 211 is configured to track any operations (e.g., reads, writes, etc.) performed on any base unit of data in the database.

In some embodiments, the storage API 208 uses the tracked data (e.g., analytics data) collected by the database monitor 211 and/or the analytics data 213 to select an optimal storage engine for a database, a collection, or a document having the observed read/write ratio. In one example, the storage API 208 is mapped to the selected storage engine. For example, an identifier of the selected storage engine may be stored in a location in memory or on disk; when a write operation request is received by the storage API 208, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 211 itself is configured to determine an optimal storage engine based on the analytics data 213 and other aspects of the data, for example, stored in the database, database collection, or in a document. This determination may be passed to the storage API 208, or otherwise used to map the storage API 208 to a determined storage engine.

The storage API 208 receives database write requests (e.g., from a database API (not shown)) via a network interface 202, and carries out the requested operations by selectively triggering one of the first storage engine 204 and the second storage engine 206. The first storage engine 204 and the second storage engine 206 are executable software modules configured to store database data in the data node 210 in a particular data format. For example, the first storage engine 204 can be configured to store data in a row-store format, and the second storage engine 206 can be configured to store data in a LSM-tree format. In one example, the first storage engine 204 and/or the second storage engine 206 are configured store primary database data (i.e., the data being stored and queried) in a particular data format in the primary data memory 212, and may store database index data in a particular data format in index data memory 214. In one embodiment, the first storage engine 204 and/or the second storage engine 206 are configured store an oplog 216 in a particular data format. As discussed in more detail below, a database monitor 211 may track a number of analytics about the database, and the operations performed on it over time, and stores that information as analytics data 213.

In some embodiments, the system 200 can be configured to provide timestamps associated with transactions and/or operations to a storage engine. In some embodiments, a storage engine can be configured to use the timestamp to determine an order in which to apply updates to data. For example, the database API 208 may receive a first transaction followed by a second transaction. In this example, the system may provide each of the first and second transactions to a storage engine with associated time stamps, where the first transaction has a timestamp that precedes a timestamp of the second transaction. The storage engine may use the provided timestamps to determine an order in which to perform the transactions. As another example, the database API 208 may receive a first write operation followed by a second write operation. In this example, the system may provide each of the first and second write operations to a storage engine to with associated timestamps where the first write operation has a timestamp that precedes a timestamp of the second write operation. The storage engine may use the timestamps to determine an order in which to perform the first and second write operations. In this example, the storage engine may perform the first write operation followed by the second write operation as the first timestamp precedes the second timestamp.

One advantage of using the storage API 208 as an abstraction layer between the database API and the storage engines is that the identity and selection of a particular storage engine can be transparent to the database API and/or a user interacting with the database API. For example, the database API may pass a "write" function call to the storage API 208 instructing the storage API to write a particular set of data to the database. The storage API 108 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 208, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 208 is the ability to add, remove, or modify storage engines without modifying the requests being passed to the API 208. The storage API 208 is configured to identify the available storage engines and select the appropriate one based on a one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines.

Figure 3:
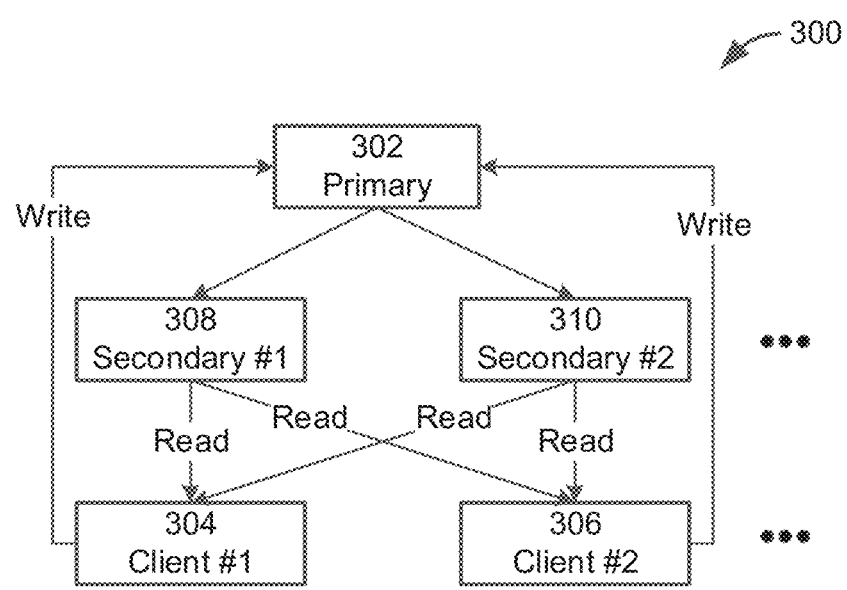
FIG. 3 illustrates a block diagram of an example replica set hosting a distributed database, according to some embodiments.

The embodiment shown and discussed with respect to FIG. 2 depicts a single database node 210. Yet in some embodiments, multiple database nodes may be provided and arranged in a replica set. FIG. 3 shows a block diagram of an exemplary replica set 300. Replica set 300 includes a primary node 302 and one or more secondary nodes 308 and 310, each of which is configured to store a dataset that has been inserted into the database. The primary node 302 can be configured to store a set (e.g., all or a portion) of data (e.g., documents and/or collections) currently in the database, and may be considered and treated as the authoritative version of the data in the event that any conflicts or discrepancies arise, as will be discussed in more detail below. While two secondary nodes 308, 310 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 302 and secondary nodes 308, 310 can be configured to store data in any number of database formats or data structures as are known in the art. In a preferred embodiment, the primary node 302 is configured to store documents or other structures associated with non-relational databases. The embodiments discussed herein relate to documents of a document-based database, such as those offered by MongoDB, Inc. (of New York, New York and Palo Alto, California), but other data structures and arrangements are within the scope of the disclosure as well.

In some embodiments, the replica set primary node 302 can be configured to only accepts write requests (disallowing read requests) from client systems 304, 306 and the secondary nodes 308, 310 only accept reads requests (disallowing write requests) from client systems 304, 306. In such embodiments, the primary node 302 receives and processes write requests against the database, and replicates the operation/transaction asynchronously throughout the system to the secondary nodes 308, 310. In some embodiments, the primary node 302 can be configured to receive and perform client write operations, and generate an oplog. Each logged operation is replicated to, and carried out by, each of the secondary nodes 308, 310, thereby bringing those secondary nodes into synchronization with the primary node 302. In some embodiments, the secondary nodes 308, 310 may query the primary node 302 to receive the operation log and identify operations that need to be replicated. In some embodiments, the operation log may be transmitted from the primary node 302 to the secondary nodes 308, 310 periodically or in response to the occurrence of a predefined condition, such as accruing a threshold number of operations in the operation log that have not yet been sent to the secondary nodes 308, 310. Other implementations can be configured to provide different levels of consistency, by restricting read requests. For example, read requests can be restricted to systems having up to date data, read requests can also in some settings be restricted to primary systems, among other options.

In some embodiments, both read and write operations may be permitted at any node (including primary node 302 or secondary nodes 308, 310) in response to requests from clients. The scalability of read operations can be achieved by adding nodes and database instances. In some embodiments, the primary node 302 and/or the secondary nodes 308, 310 are configured to respond to read operation requests by either performing the read operation at that node or by delegating the read request operation to another node (e.g., a particular secondary node 308). Such delegation may be performed based on load-balancing and traffic direction techniques known in the art.

In some embodiments, the primary node 302 and the secondary nodes 308, 310 may operate together to form a replica set 300 that achieves eventual consistency, meaning that replication of database changes to the secondary nodes 308, 310 may occur asynchronously. When write operations cease, all replica nodes of a database will eventually "converge," or become consistent. The eventually consistent model provides for a loose form of consistency. In one particular example, (assuming >3 slave systems) client systems (e.g. 304, 306) request write operations: $W(x=3)$; $W(x=7)$; $W(x=5)$. As the replication of the write requests occurs asynchronously, at some point all of the slave systems (e.g. 308, 310) will respond to a read request with 5. However, in the short term (during replication operations) client systems randomly reading from slaves can see [read operations designated by R (variable and actual value)]: $R(x=7)$; $R(x=0)$; $R(x=5)$; and $R(x=3)$. In such a configuration, replica set 300 provides eventual consistency and can permit out of order reads (in the short term). Other example implementations can increase the strength of consistency, and for example, can include monotonic read consistency (no out of order reads). Eventual consistency may be a desirable feature where high availability is important, such that locking records while an update is stored and propagated is not an option. In such embodiments, the secondary nodes 308, 310 may handle the bulk of the read operations made on the replica set 300, whereas the primary node 308, 310 handles the write operations. For read operations where a high level of accuracy is important (such as the operations involved in creating a secondary node), read operations may be performed against the primary node 302. In some embodiments, replica set 300 can be configured to perform according to a single writer eventually consistent model.

It will be appreciated that the difference between the primary node 302 and the one or more secondary nodes 308, 310 in a given replica set may be largely the designation itself and the resulting behavior of the node; the data, functionality, and configuration associated with the nodes may be largely identical, or capable of being identical. Thus, when one or more nodes within a replica set 300 fail or otherwise become available for read or write operations, other nodes may change roles to address the failure. For example, if the primary node 302 were to fail, a secondary node 308 may assume the responsibilities of the primary node, allowing operation of the replica set to continue through the outage. This failover functionality is described in U.S. patent application Ser. No. 12/977,563, entitled "METHOD AND APPARATUS FOR MAINTAINING REPLICA SETS", filed on Dec. 23, 2010, the disclosure of which is hereby incorporated by reference in its entirety.

Each node in the replica set 300 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 302 may be connected by a LAN, a WAN, or other connection to one or more of the secondary nodes 308, 310, which in turn may be connected to one or more other secondary nodes in the replica set 300. Connections between secondary nodes 308, 310 may allow the different secondary nodes to communicate with each other, for example, in the event that the primary node 302 fails or becomes unavailable and a secondary node must assume the role of the primary node.

Figure 4:
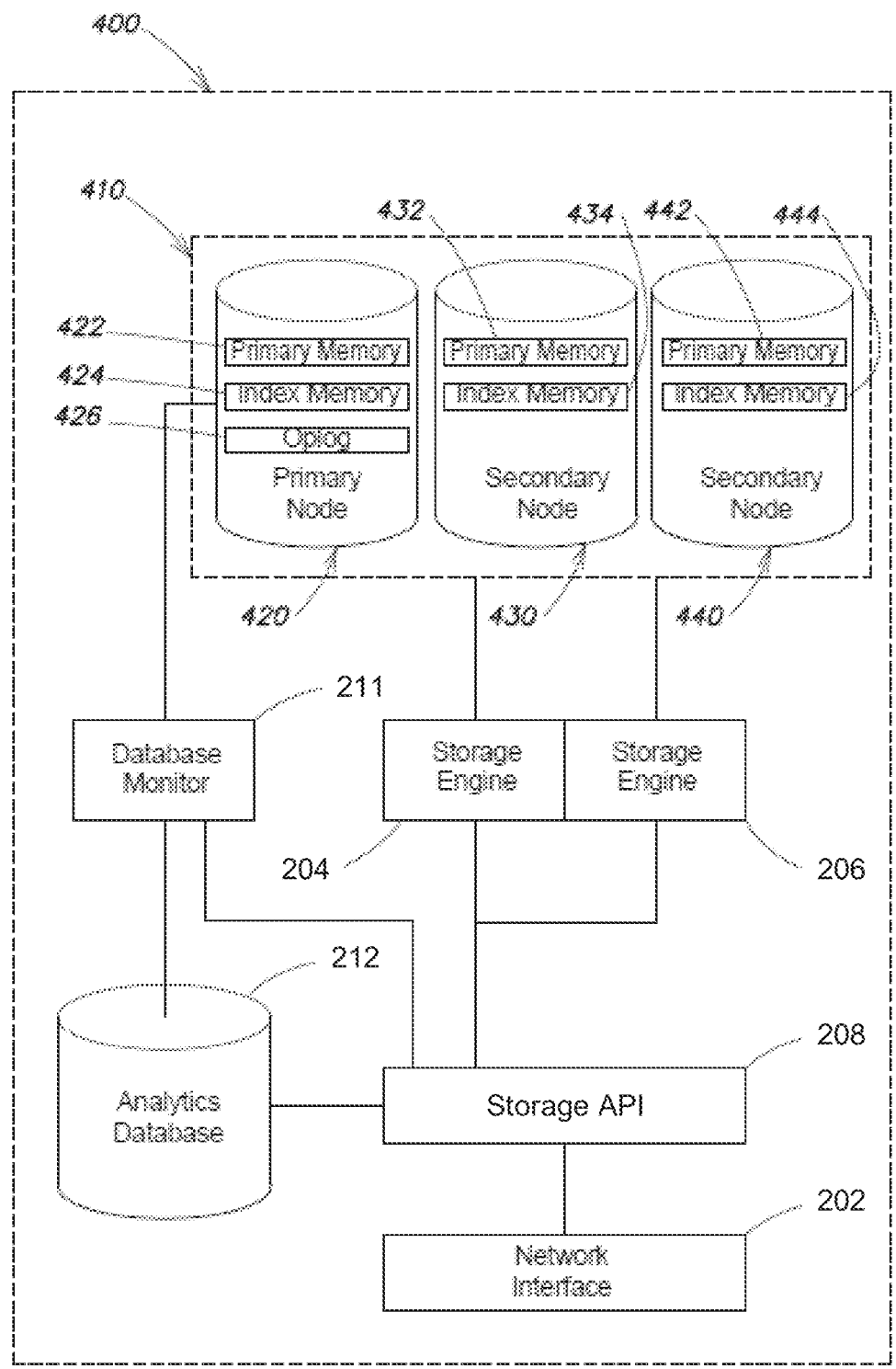
FIG. 4 illustrates a block diagram of another example distributed database system, according to some embodiments.

An example of a database subsystem 400 incorporating a replica set 410 is shown in FIG. 4. As can be seen, database subsystem 400 incorporates many of the elements of database subsystem 200 of FIG. 2 including the network interface 202, the storage engines 204, 206, the storage API 208, the database monitor 211, and the analytics database 212. Relative to the database subsystem 200 shown in FIG. 2, the database subsystem 400 replaces the single node 210 with a replica set 410 comprising primary node 420 and secondary nodes 430 and 440. In one example, the replica set 410 functions in much the same manner as the replica set 300 discussed with respect to FIG. 3. While only two secondary nodes 430 and 440 are shown for illustrative purposes, it will be appreciated that the number of secondary nodes may be scaled up or down as desired or necessary.

In some embodiments, the database subsystem 400 may be a part of database 108 described above with reference to FIG. 1. In some embodiments, the transaction engine 102 may be a component of the database subsystem 400. For example, the transaction engine 102 may receive and process transactions submitted by a client to the database subsystem 400.

In one example, database operation requests directed to the replica set 410 may be processed by the primary node 420 and either performed by the primary node 420 or directed to a secondary node 430, 440 as appropriate. In one embodiment, both read and write operations are permitted at any node (including primary node 420 or secondary nodes 430, 440) in response to requests from clients. The scalability of read operations can be achieved by adding nodes and database instances. In some embodiments, the primary node 420 and/or the secondary nodes 430, 440 are configured to respond to read operation requests by either performing the read operation at that node or by delegating the read request operation to another node (e.g., a particular secondary node 430). Such delegation may be performed based on load-balancing and traffic direction techniques known in the art.

In some embodiments, the database only allows write operations to be performed at the primary node 420, with the secondary nodes 430, 440 disallowing write operations. In such embodiments, the primary node 420 receives and processes write requests against the database, and replicates the operation/transaction asynchronously throughout the system to the secondary nodes 430, 440. In one example, the primary node 420 receives and performs client write operations and generates an oplog. Each logged operation is replicated to, and carried out by, each of the secondary nodes 430, 440, thereby bringing those secondary nodes into synchronization with the primary node 420 under an eventual-consistency model.

In some embodiments, an oplog entry may be a document. For example, the document may specify updates to target data of a transaction and/or operation. In some embodiments, an oplog entry may specify one or more write operations that are part of a transaction. In some embodiments, the system can be configured to generate an oplog entry for a respective transaction. For example, a transaction may include one or more write operations, and the system may specify all the write operation(s) in a single oplog entry. In some embodiments, the system can be configured to generate an oplog entry for each write operation in a transaction. For example, a transaction may include one or more write operations, and the system may generate an oplog entry for each of the write operation(s).

In some embodiments, an oplog entry (e.g., oplog entry document) may have a maximum size limit. In some embodiments, the maximum size limit may be 2 MB, 4 MB, 8 MB, 16 MB, 32 MB, 64 MB, 128 MB, 256 MB, 512 MB, or 1024 MB. In some embodiments, there may be no maximum size limit for an oplog entry.

In one example, primary database data (i.e., the data being stored and queried) may be stored by one or more data storage engines in one or more data formats in the primary data memory 422, 432, 442 of nodes 420, 430, 440, respectively. Database index data may be stored by one or more data storage engines in one or more data formats in the index data memory 424, 434, 444 of nodes 420, 430, 440, respectively. Oplog data may be stored by a data storage engine in a data format in oplog data memory 426 of nodes 420.

Figure 14:
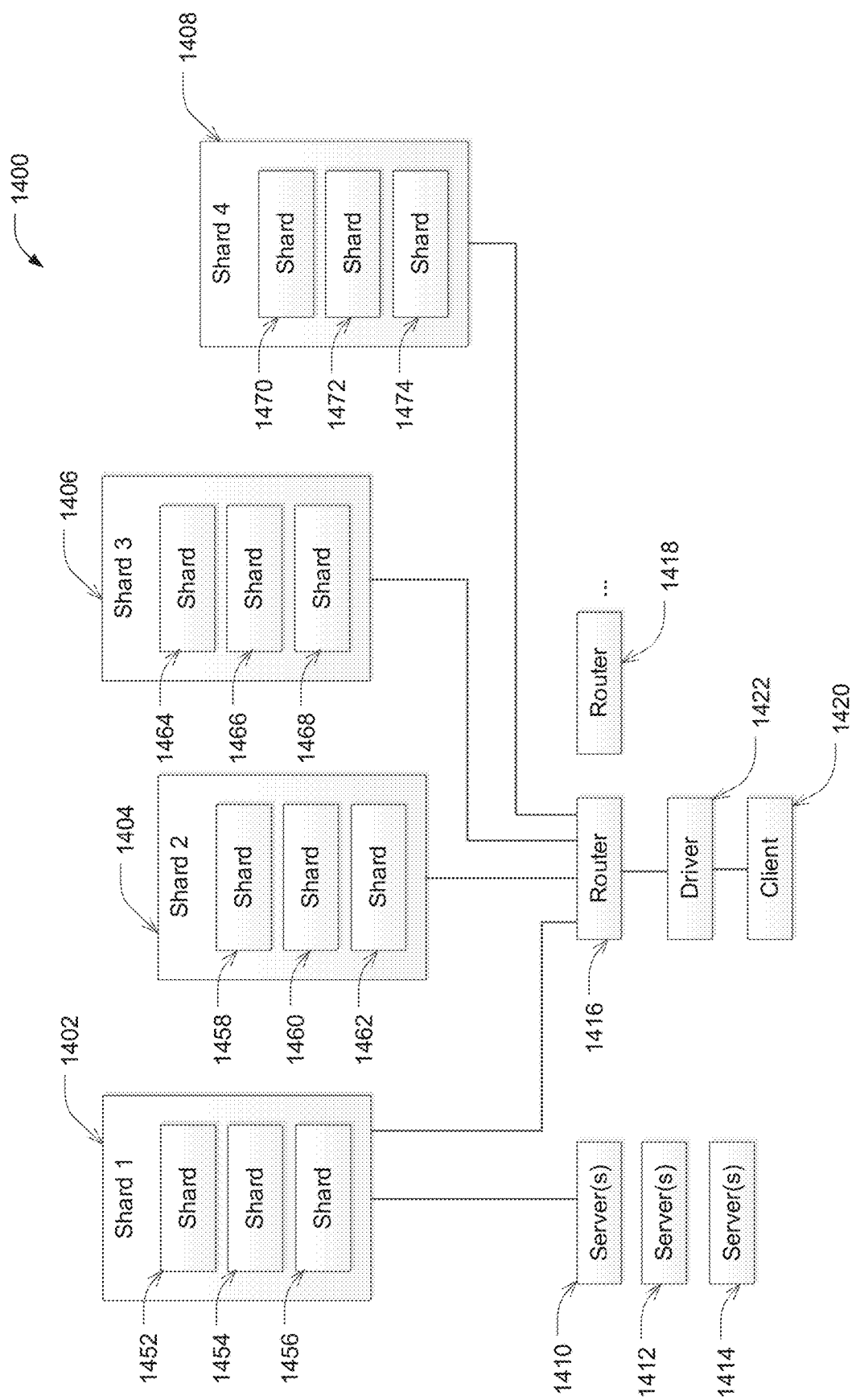
FIG. 14 illustrates a block diagram of an example architecture for a database management system, according to some embodiments.

FIG. 14 shows a block diagram of an example architecture for a managed database system 1400, according to some embodiments of the present invention. The managed database system 1400 has been specially configured as a shard cluster. The shard cluster is the grouping of shards that collectively represent the data within the database. A shard cluster typically comprises multiple shard servers (e.g., 1402-1408) hosting multiple partitions (e.g., 1452-1474) or shards of data. The managed database system 1400 can include one or more configuration servers (e.g., 1410-1414) for metadata management, and shard router processes (e.g., 1416-1418). Metadata for the shard cluster can include, for example, information on the ranges of data stored in each partition, information associated with managing the shard cluster, partition counts, number of shard servers, data index information, partition size constraints, data distribution thresholds, among other options. In some embodiments, the database system 1400 includes a driver 1422 that receives submissions of transactions and/or operations from a client 1420. The driver 1422 can be configured to receive and handle submissions of transactions and/or operations from a client application. For example, the driver 1422 can be configured to receive one or more transactions from the client 1420, and command one or more of the shard servers of the database system 1400 to execute the transaction(s).

In some embodiments, the transaction engine 102 described above with reference to FIG. 1 may be a component of the database system 1400. For example, the transaction engine 102 may receive transactions from the client 1420 and/or the driver 1422. In some embodiments, the database system 1400 may be part of database 108 described above with reference to FIG. 1.

In some embodiments, each shard of data (e.g., 1452-1474) can be configured to reside on one or more servers executing database operations for storing, retrieving, managing, removing and/or updating data. In some embodiments, a shard server (e.g., 1402-1408) contains multiple partitions of data which can also be referred to as "chunks" of database data. In some embodiments, a shard of data corresponds to a chunk of data. A chunk is also a reference to a partition of database data. A chunk can be configured as a contiguous range of data from a particular collection in the database. In some embodiments, collections are logical organizations of subsets of database data. In some embodiments, a collection can comprise one or more documents. A document can comprise a unit of data storage. The document can include one or more fields and one or more values stored in the field(s). In one example, a collection of documents is a named grouping of the data, for example, a named grouping of documents. The named grouping can be homogenous or heterogeneous. In some embodiments, collections are organizations of database data similar to relational database tables.

In some embodiments, configurations within a shard cluster can be defined by metadata associated with the managed database referred to as shard metadata. Shard metadata can include information about collections within a given database, the number of collections, data associated with accessing the collections, database key properties for a given collection, ranges of key values associated with a given partition, shard, and/or chunk of data within a given collections, to provide some examples.

In some embodiments, establishing an appropriate shard key facilitates the efficient management of data within the shard cluster. To partition a collection, a shard key pattern can be specified. The shard key pattern, in some embodiments, can be similar to the key pattern used to define an index. The shard key pattern establishes one or more fields to define the shard key upon which the managed database can distribute data. In some embodiments, the shard key pattern can be input through a management process. The shard key pattern can be predefined and/or dynamically generated. Once established, the shard key pattern can be used to control the partitioning of data. The data can be partitioned in chunks of data. A shard of data can be a chunk. The chunks of data are typically constructed of contiguous ranges of data. According to one embodiment, the congruous range of data is defined based on database key values or database key patterns used associated with the data. In some examples, chunks are defined by a triple (collection, minKey, and maxKey). A given chunk can be configured with a named for the collection to which the chunk belongs corresponding to collection in the triples and a range of key values that defined the beginning and the end of the data found within the chunk corresponding to minKey and maxKey. In one example, the shard key K associated with a given document within a collection assigns that document to the chunk where the value for K falls within the values defined by minKey and maxKey. Thus, the shard database key/shard database key pattern defines the ranges of data found within a given chunk. The shard key ranges associated with a given partition can be used by the shard cluster (e.g. through a router process) to direct database requests to appropriate shard servers hosting the particular partition.

In some embodiments, a chunk may have a maximum size. In some implementations, the maximum size can be predetermined. In some embodiments, the maximum size can be dynamically established. In some embodiments, a maximum size of 200 Mb establishes a good threshold that balances the costs of sharding (e.g., the computational burden associated with the copying/moving of the data and the versioning the chunks) against the improvement in processing by having sharded data. Some embodiments support compound shard keys/shard key patterns.

In some embodiments, the shard key should be selected to insure they are granular enough to provide for an even distribution of data. For instance, when a shard key is based on name, the database can be checked to insure there are not a disproportionate number of users with the same name. In such a case, an individual chunk can become too large and further, because of the key selected, be unable to split. In some implementations, logic can be implemented within the shard cluster to assist in selecting of the shard key. Distributions can be established and analyzed, for example during a testing phase, to insure that key does not invoke disproportionate distributions. For example, where the entire range comprises just a single key on name and a disproportionate number of users share the same name, it can become impossible to split chunks of the data without creating a new shard key. Thus, for a database where it is possible that a single value within a shard key range might grow exceptionally large, a compound shard key can be constructed that enables further discrimination of the values that a single key selection.

In some embodiments, a chunk of a data can also be associated with a maximum size threshold which defines that maximum size a given chunk can reach before a splitting operations is performed on the data within the chunk. In some embodiments, once the data within a given chunk reaches the maximum size, a managed database or a shard cluster can be configured to automatically generate a new chunk having its own range of contiguous data. In some examples, the data within the original chunk is split, approximately half the data remaining in the original chunk and approximately half the data being copied into the new created chunk. Although in some embodiments, the split can occur so that different portions of data remain in the original chunk and/or are copied into the new chunk.

In some embodiments, sharding of the database in data chunks, that is the partitioning of the data in the database, occurs based on database collections rather than the database as a whole. For example, when implementing a database management system for a service like the well-known TWITTER service, it is appreciated that the collection of "tweets" or messages within the database of the TWITTER service would be several orders or magnitude larger than the next largest collection. The size and throughput associated with the collection of tweets would be ideal for sharding, whereas smaller collections can be configured to reside on a single server. In some implementations, the data within the database is organized into documents. Some examples of document organization formats include the known JSON (JavaScript Object Notation) and BSON (binary encoded serialization of JSON) formatting for documents. BSON is a binary format in which zero or more key/value pairs are stored as a single entity. The BSON entity can be referred to as a document. In some examples, BSON is designed to be efficient in space, but in many cases is not much more efficient than JSON. In some cases BSON can employ more space than JSON to encode information. In one embodiment, this results from one of the BSON design goals: traversability. In some examples, BSON adds some additional information to documents, like length prefixes, that make it the document easier and faster to traverse. BSON is also designed to be fast to encode and decode. For example, integers are stored as 32 (or 64) bit integers, so they don't need to be parsed to and from text. This uses more space than JSON for small integers, but is much faster to parse.

Returning to FIG. 14, the three dots illustrated next to the system components indicate that the system component can be repeated. In some embodiments, adding additional shards, configuration servers, and/or shard routing processes can increase the capacity of the managed database system. The shard router processes 1416-1418 handle incoming requests (e.g., transactions and/or operations) from clients 1420 (e.g., applications, web services, user initiated requests, application protocol interfaces, etc.). The router processes 1416-1418 are configured to provide a transparent interface to handle database requests. In particular, the client 1420 need not know that a database request is being served by a sharded database. The shard router processes receive client requests and route the database requests to one or more appropriate shards, e.g., 1452-1474 on shard servers 1402-1408.

In some embodiments, a router process, e.g., 1416, can be configured to operate as a routing and coordination process that makes the various components of the cluster look like a single system, for example, to client 1420. In response to receiving a client request (e.g., a write operation) via the driver 1422, the router process 1416 routes the request to the appropriate shard or shards. The shard(s) return any results to the router process. The router process 1416 can merge any results and communicate the merged result back to the driver 1422. The driver 1422 can use the results for additional processing and/or communicate results to the client 1420.

In some embodiments, a shard may be hosted by a replica set. The replica set may include a primary node and one or more secondary nodes. In some embodiments, each of the nodes of the replica set may be a separate shard server to provide redundancy, and protection against failures. In some embodiments, the primary node may perform write operations. The secondary node(s) may replicate write operations performed by the primary node to provide redundancy. In some embodiments, if the primary node is unavailable, the database system may be unable to perform a write operation. For example, if the primary node of a replica set hosting a shard shuts down, the database may be unable to execute the write operation on the shard during the period that the primary node is shut down, or until a new primary node is selected. In some embodiments, the driver 1422 can be configured to transmit one or more write commands to a primary node of a replica set to perform one or more write operations submitted by the client 1420. For example, the driver 1422 can be configured to connect to the primary node to transmit the write command(s) to the primary node to perform write operation(s) submitted by the client 1420.

In some embodiments, the router process 1416 is configured to establish current state information for the data distributed throughout the database by requesting metadata information on the database from the configuration server(s) 1410-1414. The request for metadata information can be executed on startup of a routing process. Further requests can be initiated by the routing process and/or can be initiated by a configuration server. In one example, a change at the configuration server can trigger a distribution of updates to any routing processes.

In some embodiments, any changes that occur on the configuration server(s) can be propagated to each router process 1416-1418, as needed. In one example, router processes 1416-1418 can be configured to poll the configuration servers(s) 1410-1414 to update their state information periodically. In others examples, router processes can be configured to poll the configuration servers(s) 1410-1414 to update their state information on a schedule, periodically, intermittently, and can be further configured to received updates pushed from the configuration server(s) 1410-1414 and/or any combination of thereof. According to one embodiment, the router processes capture metadata information on the shard cluster stored at the configuration servers. In some examples, the metadata information includes information on the data stored in the database, how the data is partitioned, version information associated with the partitions, database key values associated with partitions, etc. According to some embodiments, the router process 1416 can be configured without persistent state information. For example, at initiation the router process 1416 cannot fully route data requests until its state is updated with the metadata describing the distribution of data throughout the shards.

In some embodiments, router processes can run on any server within the managed database and/or on any number of server(s) that is desired. For example, the router processes can be executed on stand-alone systems, and in other examples the router processes can be run on the shard servers themselves. In yet other examples, the router processes can be run on application servers associated with the managed database. Under typical installations, there are no limits on the number of router processes that can be invoked. The addition of routing processes can permit the managed database to route greater number of requests to the appropriate shards of data. In some embodiments, additional routing process can enable additional client connections to the partitioned database. In other embodiments, additional routing processes can facilitate management of the distribution of data within the database.

In some embodiments, each router process can be configured to act independently of any other routing processes being executed within the managed database. In some examples, the router processes do not coordinate processing, rather each router process can be configured to act independently. In some environments, this property enables unlimited numbers of router processes with virtually no additional complexity, as all the router processes receive their state information from the configuration servers and no coordination between the router processes is required for routing data requests.

In some embodiments, configuration server(s) 1410-1414 are configured to store and manage the database's metadata. In some embodiments, the metadata includes basic information on each shard in the shard cluster including, for example, network communication information, server information, number of chunks of data, chunk version, number of shards of data, shard version, and other management information for routing processes, database management processes, chunk splitting processes, etc. According to some embodiments, chunk information can be the primary data stored by the configuration server(s) 1410-1414. In some examples, chunks are defined by a triple (collection, min- Key, and maxKey) and the metadata stored on the configuration servers establishes the relevant values for a given chunk of data.

In some embodiments, each of the installed configuration server(s) has a complete copy of all the chunk metadata information for the managed database. According to one aspect, various replication strategies can be implemented to maintain consistency between configuration servers. In some embodiments, updates to configuration data stored on the configuration server can require additional processes for insuring consistency. For example, a two-phase commit operation, is used to ensure the consistency of the configuration data amongst the configuration servers. In another example, various atomic commitment protocols (ACP) are used to insure consistency of the database metadata on any configuration servers.

In some embodiments, a multi-document transaction may be performed across multiple documents, collections, shards, and/or databases. For example, a multi-document transaction may update multiple documents where a first document is located in a first collection and a second document is located in a second collection. As another example, a multi-document transaction may update multiple documents where a first document is located in a first shard and a second document is located in a second shard. As another example, a multi-document transaction may update multiple documents where a first document is located in a first database and a second document is located in second database.

Example Methods for Processing Transactions

Figure 5:
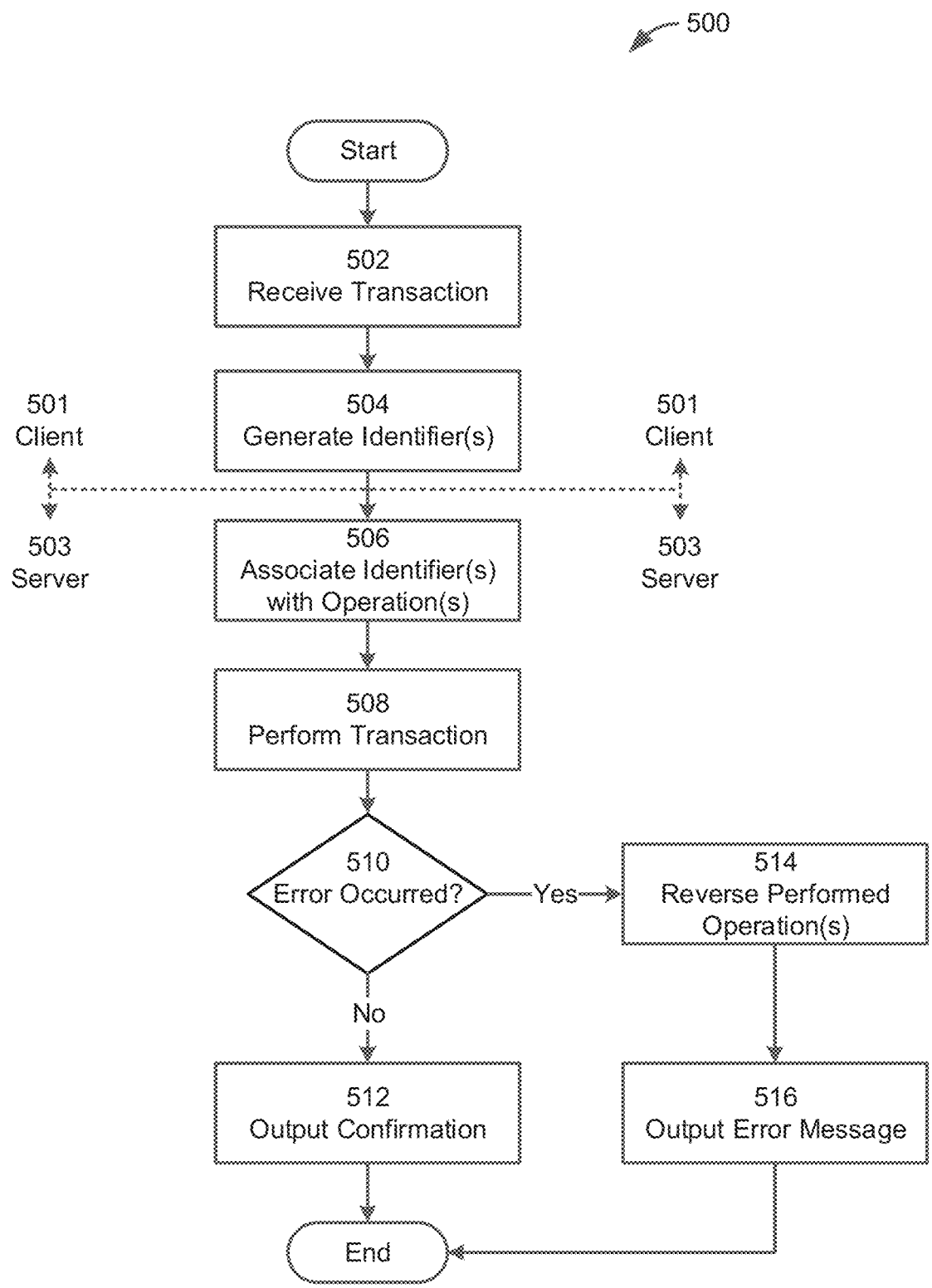
FIG. 5 is a flowchart showing an example method for processing a transaction, according to some embodiments.

As discussed above, various systems can be configured to process transactions such as multi-document ACID transactions. FIG. 5 shows an example transaction processing process 500 according to some embodiments. The transaction processing process 500 may be performed by a system (e.g., transaction engine 102 shown in FIG. 1) to process transactions against a database, such as a database employing a dynamic schema and/or an eventual consistency model. For example, the process 500 may be performed to perform transactions on database system 200 of FIG. 2, 400 of FIG. 4, and/or 1400 of FIG. 14.

The transaction processing process 500 includes an act 502 of receiving a transaction and an act 504 of generating identifier(s) that may be performed by, for example, a first processor (e.g., a processor in a client device 501). The transaction processing process 500 may further includes an act 506 of associating identifier(s) with operation(s), an act 508 of performing the transaction, an act 510 of determining whether an error occurred, an act 512 of outputting a confirmation, an act 514 of reversing performed operation(s), and an act 516 of outputting an error message that may be performed by a second processor that is separate and distinct from the first processor (e.g., a processor in a server 503).

In act 502, the system may receive a transaction. The transaction can be configured to access at least two different documents in the database and comprise a set of operations (e.g., a read operation, a write operation, etc.). A transaction configured to access at least two different documents in the database may also be referred to herein as a "multi-document transaction" or a "distributed transaction". In some embodiments, a multi-document transaction may comprise a first operation on a first document a second operation on a second document. For example, the multi-document transaction may comprise a first operation to be performed on a first document associated with a first bank account, and a second document associated with a second bank account. As another example, the multi-document transaction may correspond to a purchase of goods where a first document is inserted for an order in a collection of order documents, and inventory is decremented from a second document in a collection of inventory documents. As yet another example, the multi-document transaction may correspond to a transaction for a call billing system where a first document for a new call is added to a call record collection, and a second document storing a call plan for a subscriber is updated when the call is completed.

In some embodiments, the system can be configured to associate the transaction with a session. In some embodiments, a client may initiate a session with the system. In some embodiments, the system can be configured to receive a request from the client to establish a session in which the client can submit one or more transactions. In some embodiments, the session can be configured to represent a set of transaction(s) that are submitted by the client. In some embodiments, the system can be configured to generate a data object that stores information related to the session established with the client. In some embodiments, the system can be configured to generate a session identifier for the session. The system can be configured to associate client submitted transaction(s) to the session using the session identifier. For example, the system can be configured to include the session identifier with commands that the system transmits to a primary node for performing the transaction(s).

In some embodiments, the system can be configured to initiate a session based on a response to initiation of a session on the client system. For example, the client may start a session in order to perform transactions. In response, the system can be configured to initiate a session via which the system can receive transactions from the client. In some embodiments, the system can be configured to associate multiple client sessions with a single session through which the system may receive operations. For example, the database system may associate a single session with multiple different client sessions started by different users of a client application.

In some embodiments, the system can be configured to perform one transaction in a session at a time. For example, the system may allow one open transaction in a session. In some embodiments, the system can be configured to perform multiple transactions in a session in parallel. For example, the system may use multiple threads to perform multiple transactions received in a session in parallel. In some embodiments, the system can be configured to abort any transactions that remain open when a session ends. For example, a client may end a session while performance of a transaction has not been completed. In this example, the system may abort the transaction in response to ending of the session by the client.

In some embodiments, the system can be configured to restrict access provided to the transaction. In some embodiments, the system can be configured to restrict access by requiring privileges for one or more operations in the transaction. For example, a user may be assigned privileges to perform certain operations (e.g., update, delete, and/or insert). The privileges may specify which operations the user is allowed to perform on a database. The system can be configured to use the privileges to restrict which operations the user can submit as part of the transaction. For example, the system may determine to abort the transaction if the transaction includes one or more operations that the user is restricted from performing.

In act 504, the system may generate identifier(s) for the transaction. For example, the system may generate a transaction identifier that is a unique value, such as a GUID. The system may generate the identifier in any of a variety of ways. In some embodiments, the system may generate a unique identifier for a session on the client device 501 and generate the identifier for the transaction using the unique identifier for the session. For example, the identifier for the transaction may be generated by appending a number to the unique identifier for the session. Each subsequent transaction may be assigned a monotonically increasing number appended to the unique identifier for the session.

As discussed above and illustrated by the dashed line shown in FIG. 5, the acts 502 and 504 may be performed by the client device 501 while the remaining acts in the process 500 may be performed by a server 503 in some embodiments. In these embodiments, the client device 501 may transmit to the server 503 one or more operations associated with the transaction and the generated identifier(s). The server 503 may in turn use the received operations and the generated identifier(s) to process the transaction. Dividing the process 500 between multiple devices may advantageously reduce the total amount of time required to perform the process 500 by reducing the communication between the client device 501 and the server 503. For example, by generating the identifier at the client device 501 (instead of at the server 503), the server 503 can start processing the transaction upon receipt of the identifier and the operations instead of requesting additional information from the client device 501 (such as the session identifier for the session from which the transaction originated).

In some embodiments, acts 502 and 504 may be performed by the server 503. For example, the server 503 may receive the transaction in act 502, and generate the identifier(s) for the transaction 504 as described above. These acts may reduce computational time and resources required by the client 501 in submission of a transaction.

In act 506, the system may associate identifiers with operation(s) in the transaction. In some embodiments, the system can be configured to store a relationship between each operation in the transaction and the identifier(s) for the transaction. For example, the system may store a table with a list of the operations and the identifier associated with the transaction to which each operation originated. Thus, the particular operations associated with a given transaction may be easily identified by the system in the event a roll-back is necessary to, for example, return the database to a state before any part of the transaction was performed. In some embodiments, the system can be configured to store a document for the transaction. The system may store the identifier of transaction in the document, and store operations in the transaction in the document. For example, the system may store a table with a list of operations and the identifier in the document.

In act 508, the system may perform at least part of the transaction. For example, the system may attempt to perform at least one operation in the transaction. Example operations include write operations where one or more operations may be written to an oplog (e.g., on a primary node in the database) and/or a read operation to access information from the database (e.g., read from a secondary node in the database). In cases where the database is a distributed database (e.g., comprises a plurality of nodes), the system may push the operations in the transaction from a primary node to the secondary nodes for replication as a batch to ensure that the data stored in the secondary nodes reflects either all of the modifications in the transaction or none of the operations in the transaction. Thus, the system may not respond to read requests with only a portion of the changes in transaction.

In some embodiments, the system can be configured to perform the transaction by acquiring a lock on target data of the transaction. For example, the system may acquire a lock of one, or multiple documents that are to be modified in the transaction. As another example, the system may acquire a lock over one or more collections in which document(s) are to be modified and/or added in the transaction. In some embodiments, a lock on the target data of the transaction may prevent other transactions and/or operations from accessing the target data while the lock is in place. This may prevent multiple transactions that share target data to conflict in modifying data (e.g., documents). For example, a first transaction may modify a first document as part of the first transaction, and a second transaction may modify the first document as part of the second transaction. In this example, the system may acquire a lock when performing the first transaction to prevent the second transaction from modifying the first document while the first transaction is being performed.

In some embodiments, the system can be configured to wait a period of time to acquire a lock. In some embodiments, the system can be configured to wait for 1 ms, 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 500 ms, or 1 s to acquire a lock. In some embodiments, the period of time that the system waits to acquire a lock may be configurable. For example, a user input may specify the period of time to wait to acquire a lock. In some embodiments, the system can be configured to abort the transaction if the system is unable to acquire a lock within the period of time.

In some embodiments, the system can be configured to perform multiple transactions that target the same data sequentially. In some embodiments, the system can be configured to determine an order in which to perform the transactions based on a timestamp associated with each transaction. For example, a client system may assign a timestamp to each submitted transaction. In another example, the server may assign a timestamp to each submitted transaction. The system can be configured to submit the transactions to a storage engine with the associated timestamps. The storage engine may then use the timestamps to determine an order in which to perform the transactions. For example, the storage engine may perform a first transaction before a second transaction where a first timestamp associated with the first transaction precedes a second timestamp associated with the second transaction.

In act 510, the system may determine whether an error occurred in act 508 of performing at least part of the transaction. In some embodiments, the system may determine whether at least one attempted operation in the transaction failed (e.g., did not successfully complete). If the system determines that an error did not occur, the system may proceed to act 512 and output a confirmation that the transaction was processed successfully.

In some embodiments, the system can be configured to determine that an error occurred when the system fails to acquire a lock on target data of the transaction. For example, the system may determine that an error occurred if the system is unable to acquire a lock for a transaction within a threshold period of time (e.g., 5 ms). In some embodiments, the system can be configured to determine that an error occurred when a session that the transaction is associated ends while the transaction is still open (e.g., before all the operations of the transaction are completed). In some embodiments, the system can be configured to determine that an error occurred when the system has failed to perform and/or commit the transaction after a threshold number of attempts (e.g., 1, 2, 3, 4, or 5 attempts). In some embodiments, the system can be configured to determine that an error occurred when the system fails to connect to a database (e.g., database 108). For example, the system may determine that an error occurred if the system fails to connect to a primary node of a replica set storing target data of the transaction. In some embodiments, the system can be configured to determine that an error occurred when the transaction is in progress, and an operation outside of the transaction modifies a document that is also targeted by the transaction. For example, if the system does not acquire a lock for target data of the transaction, other operations may be able to access the target data of the transaction. Thus if the system determines that another operation is in conflict with an operation of the transaction, the system may determine that an error occurred.

If in act 510 the system determines that an error did occur during performance of the transaction, the system may proceed to act 514 of reversing the performed operation(s) in the transaction. The system may reverse the performed operation(s) by using the identifier(s) associated with the transaction. For example, the system may access a stored table that includes information regarding the relationship between one or more operations in the oplog and the transaction to which the operations originated. In this example, the system may identify the operations associated with a matching identifier and reverse the identified transactions. Once the transactions have been reversed in act 514, the system may output an error message in act 516. For example, the system may output an indication of the error that occurred such as the particular operation(s) that failed.

In some embodiments, the system can be configured to reverse the performed operation(s) to return the data back to a previous state. In some embodiments, a previous state of the data may be represented as a snapshot of the data. For example, a database system may store snapshots of data at various points in time. In some embodiments, the system can be configured to identify a current snapshot of the data at the start of performing the transaction. In the case that the system determines that an error occurred during performance of the transaction, the system may reverse the operations to return the data targeted by the transaction to its state in the identified snapshot.

Figure 6:
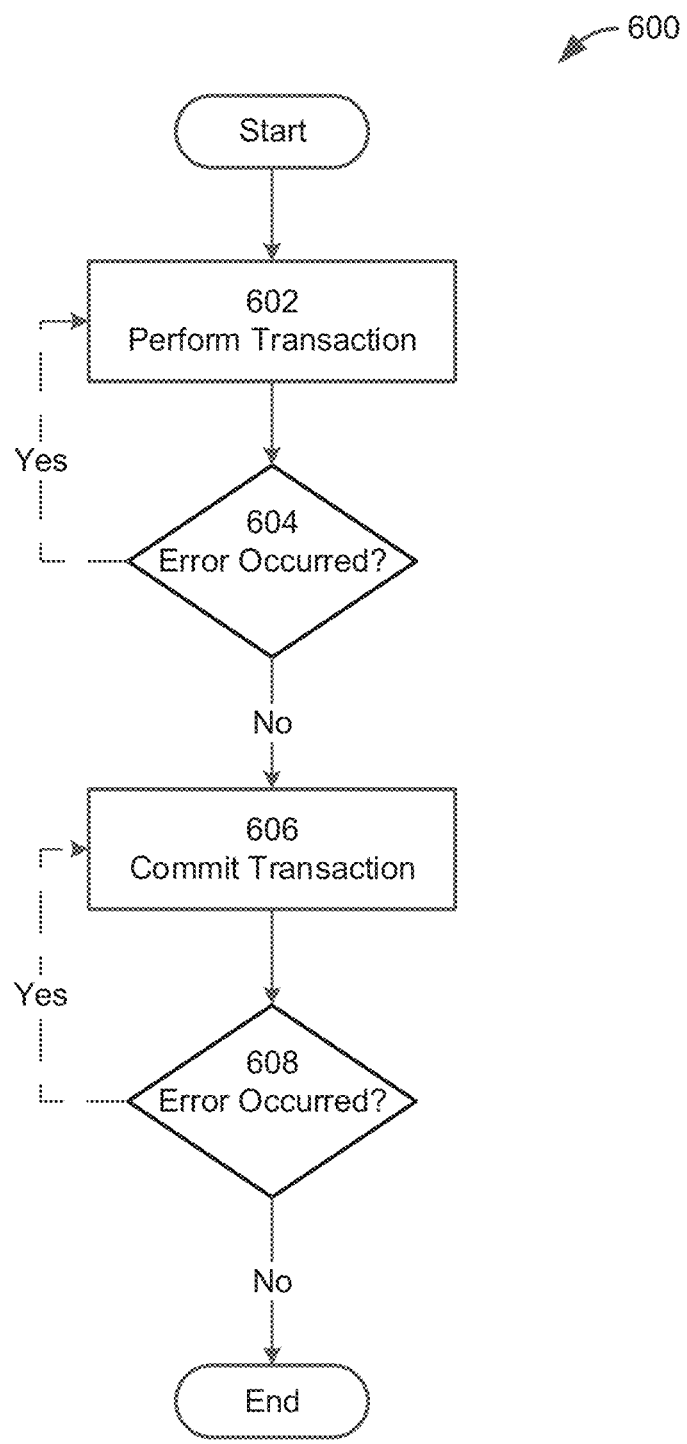
FIG. 6 is a flowchart showing an example method for performing a transaction with retry, according to some embodiments.

FIG. 6 shows an example process 600 of performing a transaction, according to some embodiments. The process 600 may be performed by a system (e.g., transaction engine 102 shown in FIG. 1) to process transactions against a database, such as a database employing a dynamic schema and/or an eventual consistency model. In some embodiments, process 600 may be performed as part of process 500 described above with reference to FIG. 5 (e.g., in act 508).

Process 600 may start when the system performing process 600 receives a transaction. In some embodiments, the system can be configured to begin process 600 when the system has performed acts 502-506 described above with reference to FIG. 5. For example, the system may begin process 600 after the system receives a transaction, generates an identifier for the transaction, and associates the generated identifier with operations of the transaction.

In act 602, the system performs at least a part (e.g., at least one operation) of a received transaction. The system can be configured to perform a part of the transaction by executing one or more operations associated with an identifier of the transaction (e.g., as described in act 503 of process 500). In some embodiments, the system can be configured to execute operation(s) to: (1) update one or more documents in a database (e.g., database 108); (2) add one or more new documents in the database; and/or (3) read information from document(s) in the database. As an example, the database can be configured to store employment information for a company's human resources department where the database includes a first collection of documents storing respective employee statuses, and a second collection of documents storing events that track changes to the employee statuses made in the first collection. In this example, the system may receive transactions to update a status of one or more employees in the first collection, and add one or more documents to the second collection tracking the employee status change(s) made in the first collection. As another example, the database can be configured to store a collection of documents specifying account balances for respective account holders. In this example, the system may receive a transaction to transfer an amount of money from a first account to a second account where the transaction includes: (1) a first update operation to reduce a balance of a transferor's account stored in a first document; and (2) a second update operation to increase a balance of a recipient's account stored in a second document.

In some embodiments, the system can be configured to perform a transaction on a database including a replica set. The system can be configured to perform the transaction by: (1) executing operation(s) of the transaction on a database hosted by a first database node (e.g., a primary node); (2) creating an oplog entry for the transaction; and (3) sending the oplog entry to one or more other database nodes (e.g., secondary nodes). The secondary node(s) may then replicate the operation(s) on respective replica sets hosted by the secondary node(s). In some embodiments the system can be configured to create an oplog entry for the transaction. In some embodiments, the system can be configured to create an oplog entry for a transaction where each of the individual operation(s) of the transaction has a respective entry in an oplog.

In act 604, the system determines whether an error occurred during performance of the transaction. In some embodiments, the system can be configured to determine that target data (e.g., document(s)) of the transaction cannot be accessed because of a conflict with another transaction. For example, another transaction may have locked the target data to perform updates to the target data. In some embodiments, the system can be configured to determine that an error has occurred when the transaction has not been completed within a timeout limit. For example, the system may determine whether a time since initiation of execution of the transaction operation(s) exceeds 30, 40, 50, 60, 70, 80, or 90 seconds. In some embodiments, the timeout limit can be a configurable parameter. For example, the system can be configured to receive input from a client system indicating a timeout limit to use. In some embodiments, the system can be configured to use a default timeout limit. For example, the system can be configured to use a default timeout limit of 60 seconds.

When the system determines that an error has occurred in act 604, the system returns to act 602 in which the system retries performance of the transaction. In some embodiments, the system can be configured to retry performance of a transaction by: (1) returning an error indication to a client system; and (2) performing one or more operations of the transactions. For example, the system sends an error message indicating a type of error that occurred when attempting execution of the transaction operation(s). In some embodiments, the client system can be configured to use the error message to trigger retrying performance of the transaction (e.g., by instructing re-execution of the transaction operation(s)). For example, the client system may include software instructions that trigger re-performance of the transaction.

In some embodiments, the system can be configured to retry performing the transaction without receiving instructions from a client system to do so. The system can be configured to retry performance of the transaction by automatically initiating execution of operation(s) associated with the transaction in response to detecting an error in act 604. For example, the system can be configured to detect a conflict with another transaction and, in response, retry performance of the transaction. When the transaction is performed again, another transaction in conflict may have completed and thus the system may access target data of the transaction.

As indicated by the dotted line connecting act 604 to 602, in some embodiments, the system can be configured to not retry performance of a transaction. For example, the system can be configured to reverse any performed operation(s) of the operation and return an error message as described in acts 514-516 of process 500 without retrying performance of the transaction. In some embodiments, the system can be configured to retry a transaction in response to detecting certain types of errors. For example, the system can be configured to retry performance of a transaction if the system detects that an identified error is transient. The system can be configured to store information indicating whether various identifiable errors are transient. In response to identifying an error that is indicated as being transient, the system retries performance of a transaction. In some embodiments, the system can be configured to determine not to retry a transaction in response to detecting certain types of errors. For example, the system can be configured to not retry a transaction in response to detecting a non-transient error. As an example, the system may determine that connection to a database failed and, in response, determine to not retry the transaction.

When the system determines that there was no error in act 604, process 600 proceeds to act 606 in which the system commits the transaction. In some embodiments, the system can be configured to commit a transaction by saving one or more changes made from performing the transaction in a database such that the changes are visible outside of the transaction (e.g., to other transactions and/or read operations). In some embodiments, changes made from performing a transaction are not visible outside of the transaction until the changes made in the transaction are committed to the database. In some embodiments, the system can be configured to commit a transaction by propagating updates to target data of the transaction to a threshold number (e.g., 1, 2, or a majority) of nodes. For example, the system can be configured to commit the transaction by propagating (e.g., saving) changes made to target data to a database hosted by a primary node. As another example, the system can be configured to commit the transaction by propagating changes made to the target data to databases of a primary node and one or more secondary nodes. In some embodiments, the number of nodes to which changes to target data must be propagated to commit a transaction can be configured. For example, the system may receive input (e.g., user input) from a client system indicating a number of nodes to which changes from a transaction must be propagated in order to commit the transaction.

In some embodiments, the system can be configured to determine that a transaction is committed by determining that a threshold number of nodes have saved changes from the transaction. In some embodiments, the system can be configured to receive acknowledgements from respective nodes indicating that the changes have been propagated at the nodes. As an example, the system can be configured to receive an indication (e.g., a message) from a primary and/or secondary node indicating that the node has saved updates from the transaction to a database hosted by the node. As another example, the system can be configured to receive an indication (e.g., a message) from a node indicating that a log entry for the transaction has been entered into an oplog of the node.

Next, process 600 proceeds to act 608 where the system determines whether the system whether an error occurred when committing the transaction in act 606. In some embodiments, the system can be configured to determine that an error occurred when committing the transaction when the system determines that changes to data from the transaction failed to propagate to a threshold number (e.g., 1, 2, 3, 4, or 5) of nodes. For example, the system can be configured to determine that an error occurred in response to determining that the threshold number of nodes did not acknowledge propagation of the changes within a time limit.

When the system determines in act 608 that an error occurred when committing the transaction, process 600 proceeds to act 606 in which the system retries committing the transaction. For example, the system can be configured to retry propagating changes made to data from the transaction to nodes of a database. In some embodiments, the system can be configured to retry performance of a transaction by: (1) returning an error indication to a client system; and (2) retrying to commit the transaction. For example, the system sends an error message indicating a type of error that occurred when attempting to commit the transaction. The client system can be configured to use the error message to retry committing the transaction (e.g., by instructing a retry of a commit operation). For example, the client system may include software instructions that include an error handling routine that triggers retrying of the commit operation.

In some embodiments, the system can be configured to retry committing a transaction without receiving instructions from a client system to do so. The system can be configured to retry committing the transaction in response to detecting an error in act 608. For example, the system can be configured to detect a failure to propagate changes to a threshold number of nodes and, in response, retrying to commitment the transaction.

As indicated by the dotted line connecting act 608 to 606, in some embodiments, the system can be configured to not retry committing a transaction. For example, the system can be configured to reverse any performed operation(s) of the transaction and return an error message as described in acts 514-516 of process 500 when an error is detected in act 608. In some embodiments, the system can be configured to retry committing a transaction in response to detecting certain types of errors. For example, the system can be configured to retry performance of a transaction if the system detects an unknown error.

When the system determines that no error occurred when committing the transaction in act 608, the process 600. The changes made from the transaction may be visible outside of the transaction. For example, a threshold number of nodes of a database may have applied the changes to respective databases hosted by the nodes. As another example, other transactions and/or operations accessing the target data of the transaction may see an updated version of the target data that resulted from the transaction.

In some embodiments, the system can be configured to abort a transaction when the system determines that performance of the transaction failed and/or commitment of the transaction failed. For example, if the system identified errors in acts 604 and/or 608 and failed to perform and/or commit the transaction thereafter, the system may abort the transaction. In some embodiments, the system can be configured to abort the transaction when the system fails to perform a transaction after a threshold number of attempts (e.g., 1, 2, 3, 4, or 5 attempts). In some embodiments, the system can be configured to abort the transaction when the system fails to commit a transaction after a threshold number of attempts (e.g., 1, 2, 3, 4, or 5 attempts). In some embodiments, the system can be configured to abort a transaction by reversing any performed operation(s) of the transaction, and outputting an indication of the abort. For example, the system can be configured to transmit an error message indicating the abort to a client system from which the transaction was received.

Figure 7:
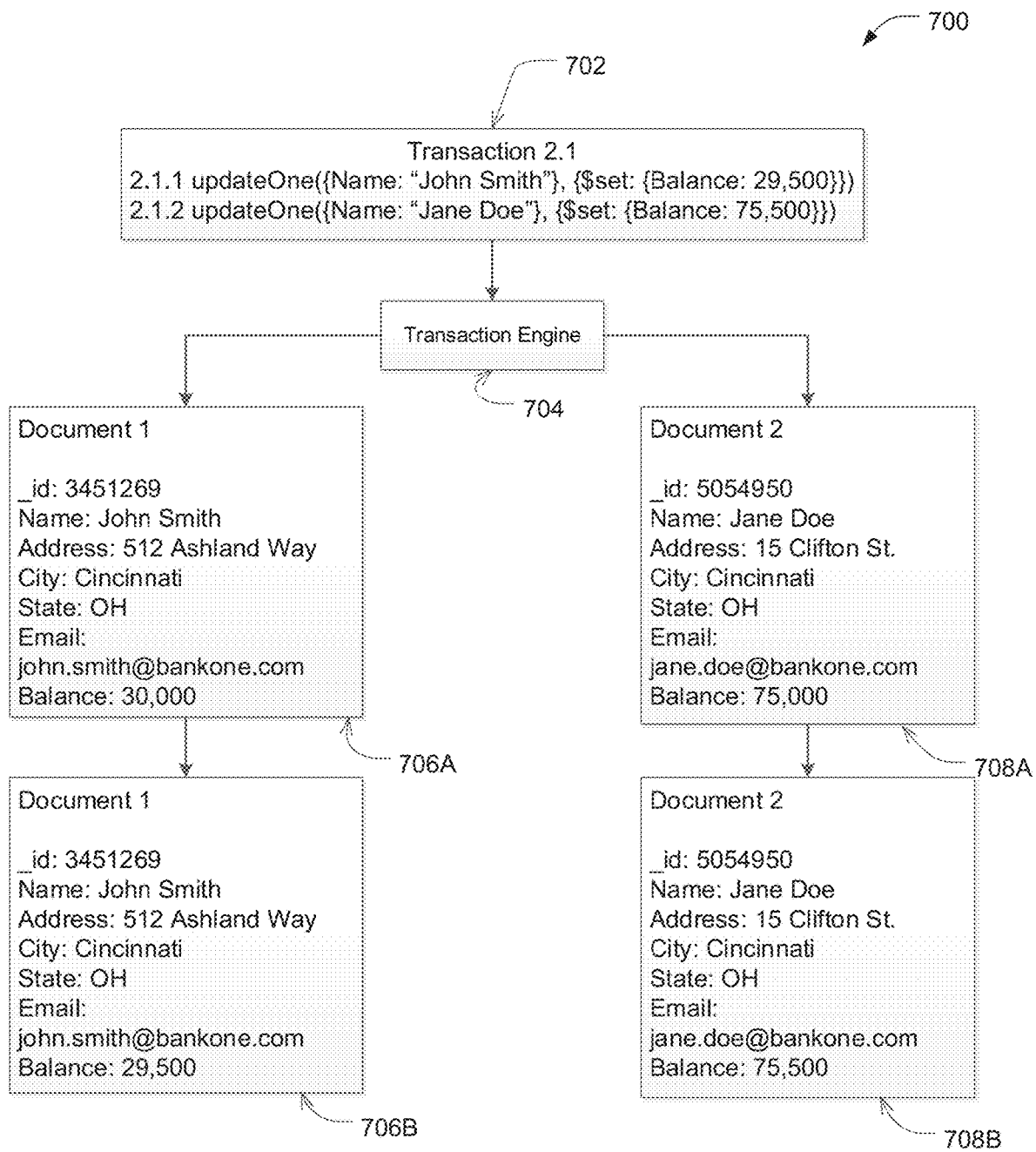
FIG. 7 illustrates an example of a multi-document transaction, according to some embodiments.

FIG. 7 illustrates an example performance 700 of a multi-document transaction, according to some embodiments. In the example of FIG. 7, transaction engine 704 performs a transaction 702 to transfer funds from a John Smith's bank account to Jane Doe's bank account. In some embodiments, transaction engine may be transaction engine 102 described above with reference to FIG. 1.

As illustrated in FIG. 7, the transaction 702 includes multiple operations. The operations include: (1) a first operation to update an account balance for John Smith; and (2) a second operation to update an account balance for Jane Doe. The operations may result in deduction of an amount from John Smith's account, and an addition of the amount to Jane Doe's account. As illustrated in FIG. 7, the transaction 702 includes an identifier "2.1" with its operations associated with the identifier. For example, the first operation has an identifier of 2.1.1 and the second operation is has an identifier of 2.1.2. In some embodiments, the transaction identifier and association of the operations to the identifier can be performed by a client system that submitted the transaction. In some embodiments, the transaction engine 704 can be configured to generate the transaction identifier and associate the operations to the identifier (e.g., in a table).

As illustrated in FIG. 7, each of the operations specifies target data to be updated as part of the transaction 702. The first operation specifies that the transaction engine 704 is to update a document associated with John Smith's account to modify the account balance (e.g., by reducing the balance). The second operation specifies that the transaction engine 704 is to update a document associated with Jane Doe's account to modify the account balance (e.g., by increasing the balance).

As illustrated in FIG. 7, the transaction engine 704 performs the transaction 702 by executing each of the operations of the transaction 702. In some embodiments, the transaction engine 704 can be configured to perform the transaction as described above with reference to FIGS. 5 and 6. The transaction engine 704 can be configured to identify target data in a database, and execute operations on the target data. As illustrated in FIG. 7, the transaction engine 704 performs the transaction 702 by: (1) updating document 1 706A associated with John Smith to reduce the balance by $500 to obtain an updated document 1 706B; and (2) updating document 2 708A associated with Jane Doe to increase the balance by $500 to obtain an updated document 2 708B.

In some embodiments, the transaction engine 704 can be configured to commit the transaction 702 to a database. The transaction engine 704 can be configured to commit the transaction 702 to the database by propagating the updates to one or more nodes. For example, the transaction engine 704 commits the transaction 702 by propagating updates to document 1 706A and document 2 706B to one or more nodes of the database. The transaction 702 may be committed when the documents 706A, 708A have been updated in databases hosted by the node(s). Accordingly, transactions and/or operations subsequent to transaction 702 may access updated documents 706B, 708B.

In some embodiments, the transaction engine 704 can be configured to abort the transaction 702 if it encounters a failure. For example, the transaction engine 704 may abort the transaction 702 if it determines that an error occurred during performance of operations of the transaction and/or committing of the transaction. In some embodiments, the transaction engine 704 can be configured to retry the transaction 702 and/or committing the transaction 702 (e.g., if certain types of errors occur). For example, the transaction engine 704 may retry the transaction 702 and/or committing of the transaction 702 as described above with reference to FIG. 6.

FIG. 8A illustrates an example of code 800 for performing a multi-document transaction in a database, according to some embodiments. The code 800 may be used to implement at least part of process 500 described above with reference to FIG. 5. For example, the code may be executed to perform a transaction in a MongoDB database. In the example of FIG. 8A, the first line of code 801 starts a client session, through which a client system can submit transactions to a database system (e.g., to a transaction engine of the database system). The second line of code 802 starts a new transaction in the session initiated by line 801. The transaction includes two operations including: (1) inserting a first new document into a first collection at line 804; and (2) inserting a second new document into a second collection at line 806. A transaction engine (e.g., transaction engine 102) can be configured to execute write operations to add the first new document to the first collection and the second new document to the second collection. After executing the two operations at lines 804-806, the code 800 commits the transaction at line 808. The transaction engine can be configured to commit the transaction by propagating (e.g., saving) changes from the operations at lines 804-806 to one or more nodes of the database such that the changes are visible outside of the transaction (e.g., to other transactions, operations, and/or client sessions).

FIG. 8B illustrates another example of code 810 for performing a multi-document transaction in a database, according to some embodiments. The code 810 may be used to implement at least part of process 500 described above with reference to FIG. 5. For example, the code may be executed to perform a transaction in a MongoDB database. In the example of FIG. 8B, the first line of code 811 starts a client session, through which a client system can submit transactions to a database system (e.g., to a transaction engine of the database system). The second line of code 812 starts a new transaction in the session initiated by line 811. The transaction includes two operations including: (1) inserting a first new document into a first collection at line 813; and (2) inserting a second new document into a second collection at line 814. A transaction engine (e.g., transaction engine 102) can be configured to execute write operations to add the first new document to the first collection and the second new document to the second collection. After executing the two operations at lines 813-814, the code 800 commits the transaction at line 816. The transaction engine can be configured to commit the transaction by propagating (e.g., saving) changes from the operations at lines 814-816 to one or more nodes of the database such that the changes are visible outside of the transaction (e.g., to other transactions, operations, and/or client sessions).

FIG. 8C illustrates another example of code 820 for performing a multi-document transaction in a database, according to some embodiments. The code 820 may be used to implement at least part of process 500 described above with reference to FIG. 5. For example, the code may be executed to perform a transaction in a MongoDB database. In the example of FIG. 8C, the first line of code 822 starts a new transaction. The transaction includes two operations including: (1) inserting a new stock order at line 824 into a collection storing stock order records; and (2) updating a stock record in a collection storing stock records. A transaction engine (e.g., transaction engine 102) can be configured to execute an insert operation to add a document for the new order into the order collection, and to execute an update operation to update the stock record in the stock record collection. After executing the two operations at lines 824-826, the code 820 commits the transaction at line 828. The transaction engine can be configured to commit the transaction by propagating (e.g., saving) changes in data from the operations at lines 824-826 to one or more nodes of the database such that the changes are visible outside of the transaction (e.g., to other transactions, operations, and/or client sessions).

FIG. 8D illustrates an example of code 830 for performing a multi-document transaction in a database, according to some embodiments. The code 830 may be used to implement at least part of process 500 described above with reference to FIG. 5. For example, the code may be executed to perform a transaction in a MongoDB database. In the example of FIG. 8D, the fire line of code 832 starts a new client session (e.g., via which transactions may be submitted to a transaction engine). The second line of code 834 initiates a new transaction in the session started at line 832. The transaction initiated at line 834 includes multiple operations including: (1) a first operation at line 834A to insert a first new document; and (2) a second operation at line 834B to insert a second new document.

In the example of FIG. 8D, the transaction also includes an exception routine 836 to execute in case of an error or failure. Examples of errors and failures are described herein (e.g., in reference to FIG. 5). The exception routing 836 includes aborting of the transaction at line 836A. For example, if the system activates the exception in response to determining an error, the system may abort the transaction. The system may abort the transaction by reversing any of the performed operations on data targeted by the transaction. For example, if the system had executed the operations at lines 834A and 834B, and then detected an error, the system may reverse the two operations (e.g., by removing the first and second inserted documents from the collection). In another example, if the system had executed the operation at line 834A but had not yet executed the operation at line 834B, the system may reverse the executed operation (e.g., by removing the first inserted document from the collection).

In the example of FIG. 8D, the code 830 includes a command to commit the transaction at line 838. The system may commit the transaction by propagating the changes made to the target data (e.g., the documents and/or collection) to one or more nodes (primary node and/or one or more secondary nodes) of the database.

FIG. 13A illustrates example code 1300 implementing a function to retry performance of a transaction, according to some embodiments. For example, code 1300 may be executed by transaction engine 102 to perform at least a part of acts 602-604 described above with reference to FIG. 6.

The code 1300 includes a function definition at line 1302 which defines a new function for performing a transaction, and retrying the transaction if a type of error is detected. As illustrated in FIG. 13A, the function receives as input: (1) a transaction function; and (2) a session. At line 1304, the system attempts to perform the transaction. At line 1306, the system determines whether than error occurred during performance of the transaction. At line 1306A, the system determines whether the error that occurred is a transient transaction error. A transient transaction error may be an error that the system determines is temporal. At line 1306B, the system prints a message that the transaction is being retried, and then retries performing the transaction at line 1306C. If the system determines that the error is not a transient error, then the system proceeds to the set of code at line 1308. The system then prints a message that the transaction has been aborted at line 1308A, and then throws an error at line 1308B. For example, the system may output a message, and return an error code or identifier.

Although in the example of FIG. 13A, the system retries a transaction in the case of a transient error, some embodiments are not limited in this respect. In some embodiments, the system can be configured to retry a transaction for any type of error. In some embodiments, the system can be configured to retry a transaction for one or more types of errors instead of or in addition to a transient error.

FIG. 13B illustrates example code 1310 for retrying to commit a transaction, according to some embodiments. For example, code 1310 may be executed by transaction engine 102 to perform at least a part of acts 606-608 described above with reference to FIG. 6.

The code 1310 includes a function definition at line 1312 which defines a new function for retrying commitment of a transaction. As illustrated in FIG. 13B, the function receives as input a session object identifying a session (e.g., that a transaction is associated with). At line 1314, the attempts to commit a transaction. For example, a transaction may have been initiated in the session and the system may attempt to commit one or more updates to target data of the transaction. If the system encounters an error when committing the transaction, the system proceeds to line 1316. At line 1316A, the system determines whether the error resulted in an unknown result of the commitment. For example, the system may determine that the error causes an unknown result of the commitment by determining that the system failed to receive acknowledgement of changes to target data being saved by a threshold number (e.g., majority) of replica set members. If the system determines that the error resulted in a unknown result of the commitment, the system outputs a message that the system is retrying to commit the transaction at line 1316B, and then retries to commit the transaction at line 1316C. If the system encounters a different type of error at line 1316A than one that results in an unknown transaction commitment result, then the system proceeds to line 1318 where the system outputs a message that an error was encountered at line 1318A, and then throws an error 1318B. For example, the system may output a message, and return an error code or identifier.

Although in the example of FIG. 13B, the system retries a transaction in the case of an error that results in an unknown result of commitment, some embodiments are not limited in this respect. In some embodiments, the system can be configured to retry a transaction for any type of error. In some embodiments, the system can be configured to retry a transaction for one or more types of errors instead of or in addition to one that results in an unknown result of commitment.

FIG. 13C shows example code 1320 for implementing a transaction with transaction retry and commitment retry using the functions of FIGS. 13A-B, according to some embodiments. For example, the code 1320 may be executed by transaction engine 102 to implement process 600 described above with reference to FIG. 6.

The code 1320 includes a function definition 1322 for a multi-document transaction to update information about an employee. The function receives as input a session object. The session object may associate the transaction with a particular session in which the transaction was submitted. At line 1322A the system accesses a first collection of employees (e.g., documents storing employee information). At line 1322B, the system accesses a second collection of events (e.g., documents storing event reports). At line 1322C, the system starts the transaction in the session with a read concern of "snapshot" and a write concern of "majority". These configuration parameters may specify that the system is to: (1) read target data of the transaction from the state of the data in a latest snapshot of the data; and (2) commit any write operations by saving them at a majority of replica set members (e.g., nodes).

At line 1322D, the system performs a first operation of the transaction in which the system updates a status of a particular employee in the employee collection to "inactive". The status may be a field in an employee document. The system performs a second operation of the transaction in which the system updates an event associated with the employee in the events collection by setting a new status to "inactive" and an old status to "active". The new status and old status may be fields in an event document. If the system determines that an error occurred during the transaction (e.g., during performance of any of the operations), then the system proceeds to lines 1322F-H, where the system prints that the transaction is aborting, aborts the transaction, and throws an error. At line 13221, the system calls the function to commit the transaction with retry by calling the retry commit function defined by code 1310 of FIG. 13B. When executing line 13221, the system may commit the transaction by propagating updates from the transaction to a threshold number of nodes, and retry committing the transaction as described above with reference to FIG. 13B.

At line 1324, the system starts a session with a read preference of "primary". The read preference indicates that the system is to prioritize reading of data from a primary node of a replica set. At line 1326, the system performs the transaction defined by function 1322 with retry by (1) calling retry transaction function defined by code 1300 of FIG. 13A; and (2) passing the function defining a transaction to update information about and employee along with the session started at line 1324 as arguments to the retry transaction function. The system may then perform the transaction to update the employee information, and retry performance of the function if an error is detected during performance of the transaction as described above with reference to FIG. 13A. If the system encounters an error after executing the retry transaction function, the system proceeds to line 1328 where the system executes an error routine. For example, the system may output a message indicating that the transaction failed. At line 1330, the system ends the session.

Example Transaction Implementation

As described herein, a transaction may include one or more operations. Examples of operations that can be included in a transaction include the following.

1. aggregate( )—Determines values for a set of data. For example, the operation may determine aggregate values for a set of data (e.g., a collection and/or a view).
2. countDocuments( )—Determines a number of documents in a set of data.
3. distinct( )—Finds distinct values for a specified field across a set of data.
4. find( )—Selects documents in a set of data based on values of one or more fields specified by the operation.
5. geoSearch( )—Select documents in a set of data based on a location. For example, the geoSearch( ) operation may select documents based on location coordinates, city, state, country, zip code, and/or other location identifier.
6. deleteMany( )—Removes one or more documents from a set of data according to a filter specified in the operation.
7. deleteOne( )—Removes a single document from a set of data according to a filter specified in the operation.
8. remove( )—Remove one or more documents from a set of data.
9. findOneAndDelete( )—Remove the first document identified in a set of data from filter and/or sort criteria.
10. findOneAndReplace( )—Modifies and replaces the first document in asset of data identified from filter and/or sort criteria.
11. findOneAndUpdate( )—Update the first document identified in set of data from filter and sort criteria.
12. insertMany( )—Insert multiple documents into a set of data.
13. insertOne( )—Insert a document into a set of data.
14. insert( )—Insert one or more documents into a set of data.
15. save( )—Update an existing document in a set of data or insert a new document into a set of data.
16. updateOne( )—Update the first document in a set of data identified from a filter.
17. updateMany( )—Update multiple documents in a set of data identified from a filter.
18. replaceOne( )—Replace a single document in a set of data based on a filter.
19. update( )—Modifies one or more documents in a set of data.
20. bulkWrite( )—Executes a set of multiple write operations.
21. countDocuments( )—Counts the number of documents in a set of data.
22. isMaster( )—Returns replica set configuration and status of the system. For example, the operation may return an indication of whether a particular node that the system is connected to is a primary or a secondary node of a replica set.
23. buildInfo( )—Returns a build summary for a current build of the database. For example, the operation may return a version of a storage engine being used by the node.
24. connectionStatus( )—Returns information about a current connection to a database. For example, the information may include a health status of the connection and/or privileges granted to a user that initiated a session which the transaction is associated with.

In some embodiments, a transaction may be restricted from including operations that affect a catalog of a database. For example, the transaction may be restricted from including operations that result in creation of a new collection. In some embodiments, a transaction may include operations that affect a catalog of a database.

In some embodiments, a transaction may use a read preference indicating one or more nodes from which data targeted by the transaction may be read from. For example, the transaction may specify a read preference of "primary", indicating that data is to be read from data hosted by a primary node of a replica set. As another example, the transaction may specify a read preference of "secondary", indicating that the data is to be rad from the data hosted by a secondary node of a replica set. As another example, the transaction may specify a read preference of "nearest", indicating that the data is to be read from the nearest available node. In some embodiments, a transaction may route all operations to a single node of a replica set. For example, all read and/or write operations may be routed to a primary node of the replica set. In these embodiments, the transaction may use a read preference of "primary".

In some embodiments, a transaction may use a write concern indicating a level of acknowledgement required to commit the transaction. In some embodiments, a transaction may use one of the following write concerns.
1. w: 1—Returns acknowledgement after the transaction has been committed to a primary node.
2. w: "majority"—Returns acknowledgement after the transaction has been applied to a majority of replica set members (e.g., nodes). In some embodiments, the write concern may return an acknowledgement when a majority of the voting replica set members have acknowledged committing the transaction.

In some embodiments, a transaction may use a read concern for target data of the transaction to be read from. A read concern may indicate a level of consistency and availability guarantee of the target data. In some embodiments, a transaction may use one of the following read concerns:
1. Local—Returns the most recent data available from a node is used. There is no guarantee that the data has been written to a majority of replica set members.
2. Majority—Returns data that has been acknowledged by a majority of replica set members. In some embodiments, the returned data may be guaranteed to be acknowledged by a majority of the replica set members if the transaction write concern is also set to "majority". In these embodiments, if the transaction does not use the "majority" write concern, the "majority" read concern may not guarantee that the read operations read majority-committed data.
3. Snapshot—Returns data from a snapshot of majority committed data. In some embodiments, the returned data may be guaranteed to be from a snapshot of majority committed data if the transaction write concern is set to "majority". In these embodiments, if the transaction does not use a write concern of "majority", then the "snapshot" read concern may not guarantee that the read operations read data from a snapshot of majority-committed data.

In some embodiments, a transaction may use a read preference, read concern, and/or write concern specified by a session that the transaction is associated with. For example, the transaction may use the read preference, read concern, and/or write concern set for the session. In some embodiments, the read preference, read concern, and/or write concern can be set for each individual transaction. For example, software instructions for the transaction may include configuration parameter values specifying the rad preference, read concern, and/or write concern. In some embodiments, a transaction may use the read preference, read concern, and/or write concern of a session that the transaction is associated with by default.

In some embodiments, a transaction may have a runtime limit. In some embodiments, a transaction may have a default runtime limit. For example, the transaction may have a default runtime limit of 1 s, 10 s, 30 s, 60 s, 120 s, or 180 s. In some embodiments, the runtime limit for a transaction may be configurable. A user may set a configuration option to specify a runtime limit for the transaction. For example, a user may set a value of the transactionLifetimeLimitSeconds parameter of the transaction to set a runtime limit for the transaction. In some embodiments, the system performing the transaction may abort the transaction when it determines that time to perform the transaction exceeds the runtime limit. For example, if the system is taking longer than the runtime limit (e.g., 60 s) to perform a transaction, the system may automatically abort the transaction.

In some embodiments, the system can be configured acquire a lock on target data of a transaction in order to perform the transaction. In some embodiments, the system can be configured to wait a period of time (e.g., 5 ms) to acquire a lock. If the system is unable to acquire a lock in the period of time, the system may detect an error. In some embodiments, the period of time that the system waits to acquire a lock for a transaction may be configurable. A user may set a configuration option to specify a period of time to wait to acquire a lock. For example, a user may set a value of the maxTransactionLockRequestTimeoutMillis parameter to adjust how long to wait to acquire a lock. Increasing maxTransactionLockRequestTimeoutMillis allows operations in the transactions to wait the specified time to acquire the required locks. In some cases, this can help obviate transaction aborts on momentary concurrent lock acquisitions, like fast-running metadata operations. However, in other cases increasing the time could possibly delay the abort of deadlocked transaction operations.

In some embodiments, a transaction may include one or more read operations. In some embodiments, the system can be configured to perform a read operation in a transaction to ensure that target data of the read operation is in its most updated state. For example, the system may verify that the targeted data has not been updated by an operation outside of the transaction. In some embodiments, the system can be configured to ensure that target data of a read operation is in its most updated state by using a findOneAndUpdate( ) function which returns original data from the database (e.g., from a snapshot), or an updated version of the data if the data has been updated. In some embodiments, the system can be configured to abort a transaction if target data of a read operation has been updated outside of the transaction.

In some embodiments, the system can be configured to perform chunk migration, where the system acquires a lock over a set of data (e.g., a collection) when migrating the set of data from one shard to another. In some embodiments, the system can be configured to delay chunk migration if a transaction has acquired a lock over a portion (e.g., all) of the set of data. In some embodiments, the system can be configured to return and error and abort a transaction when the system determines that chunk migration was in session prior to initiation of the transaction.

Example Special-Purpose Computer System

A special-purpose computer system can be specially configured as disclosed herein. According to one embodiment of the invention the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 9:
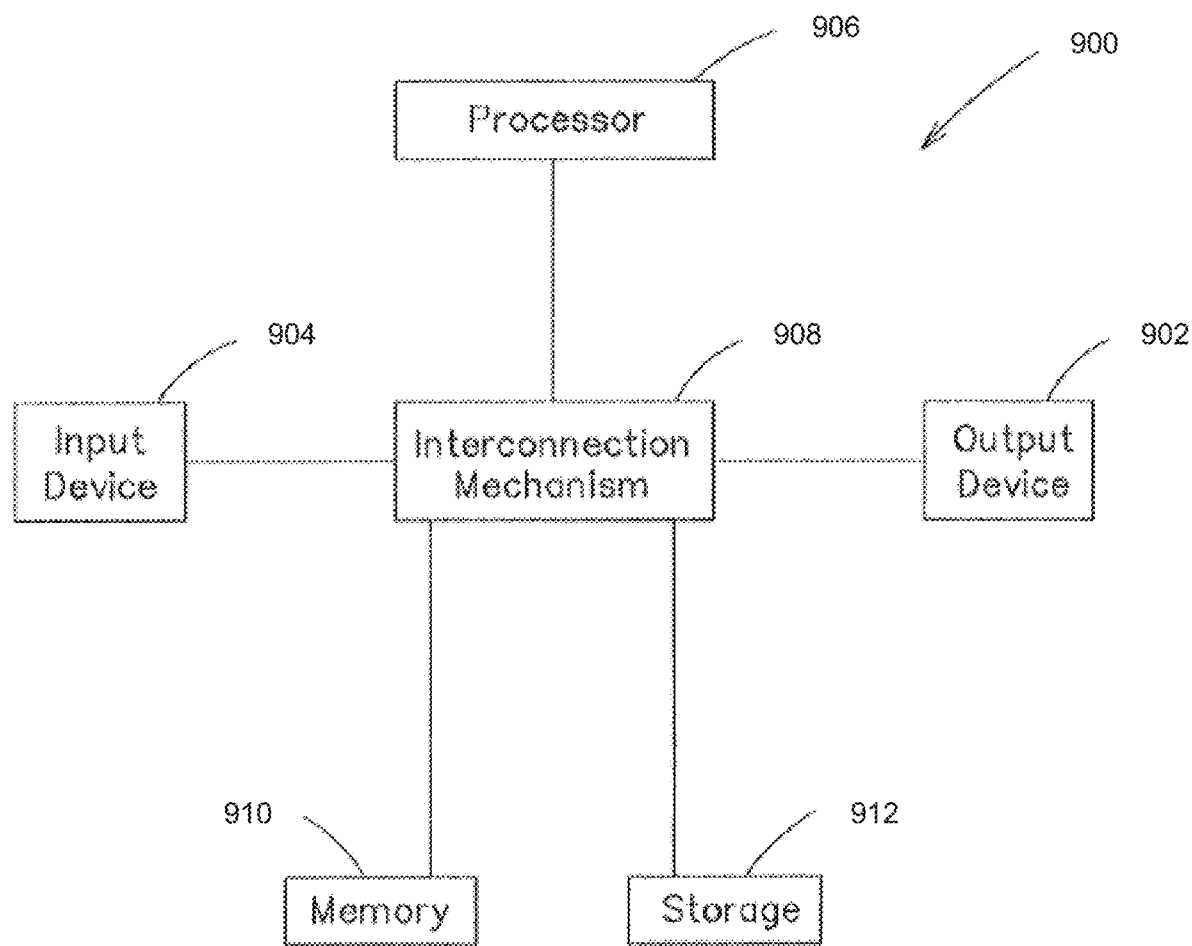
FIG. 9 is a block diagram of an example special-purpose computer system, according to some embodiments.

FIG. 9 shows a block diagram of an example special-purpose computer system 900 on which various aspects of the present invention can be practiced. For example, computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writeable nonvolatile recording medium in which computer executable instructions are stored that define a program to be executed by the processor or information stored on or in the medium to be processed by the program.

Figure 10:
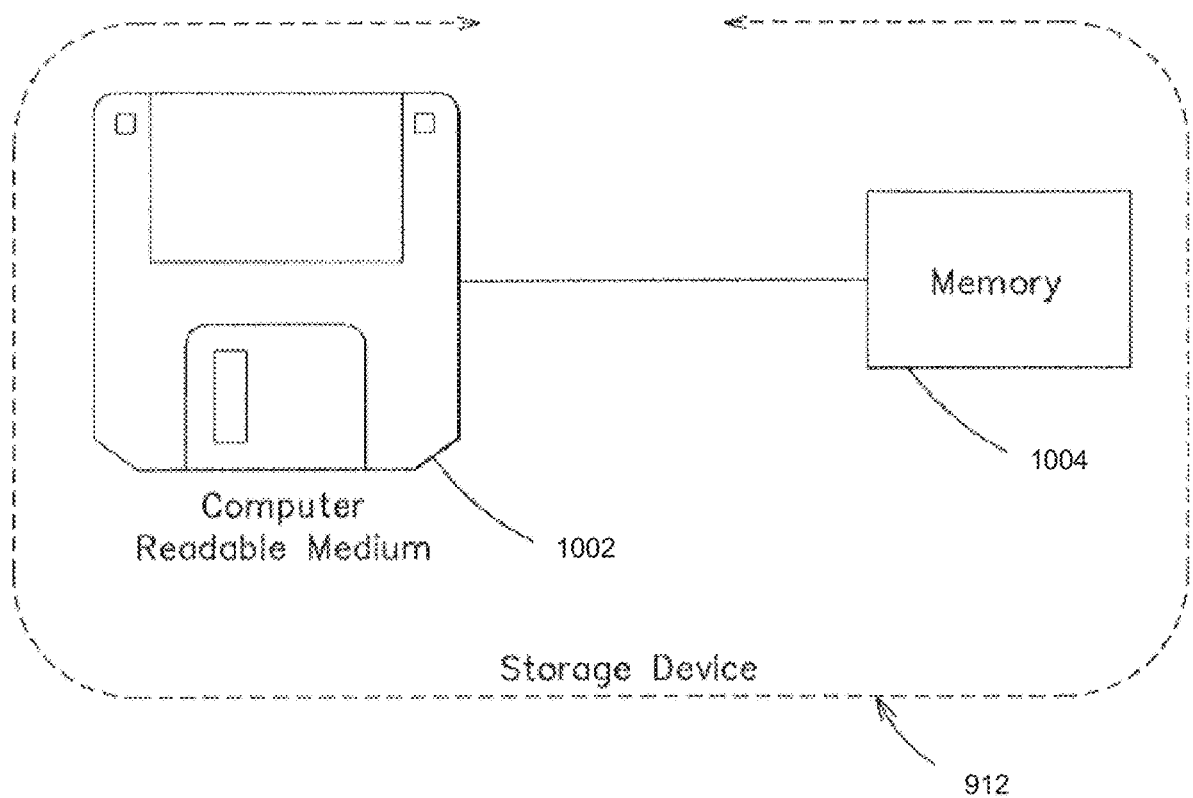
FIG. 10 is a block diagram of an example disk or flash memory, according to some embodiments.

The medium can, for example, be a disk 1002 or flash memory as shown in FIG. 10. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 9, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

Figure 11:
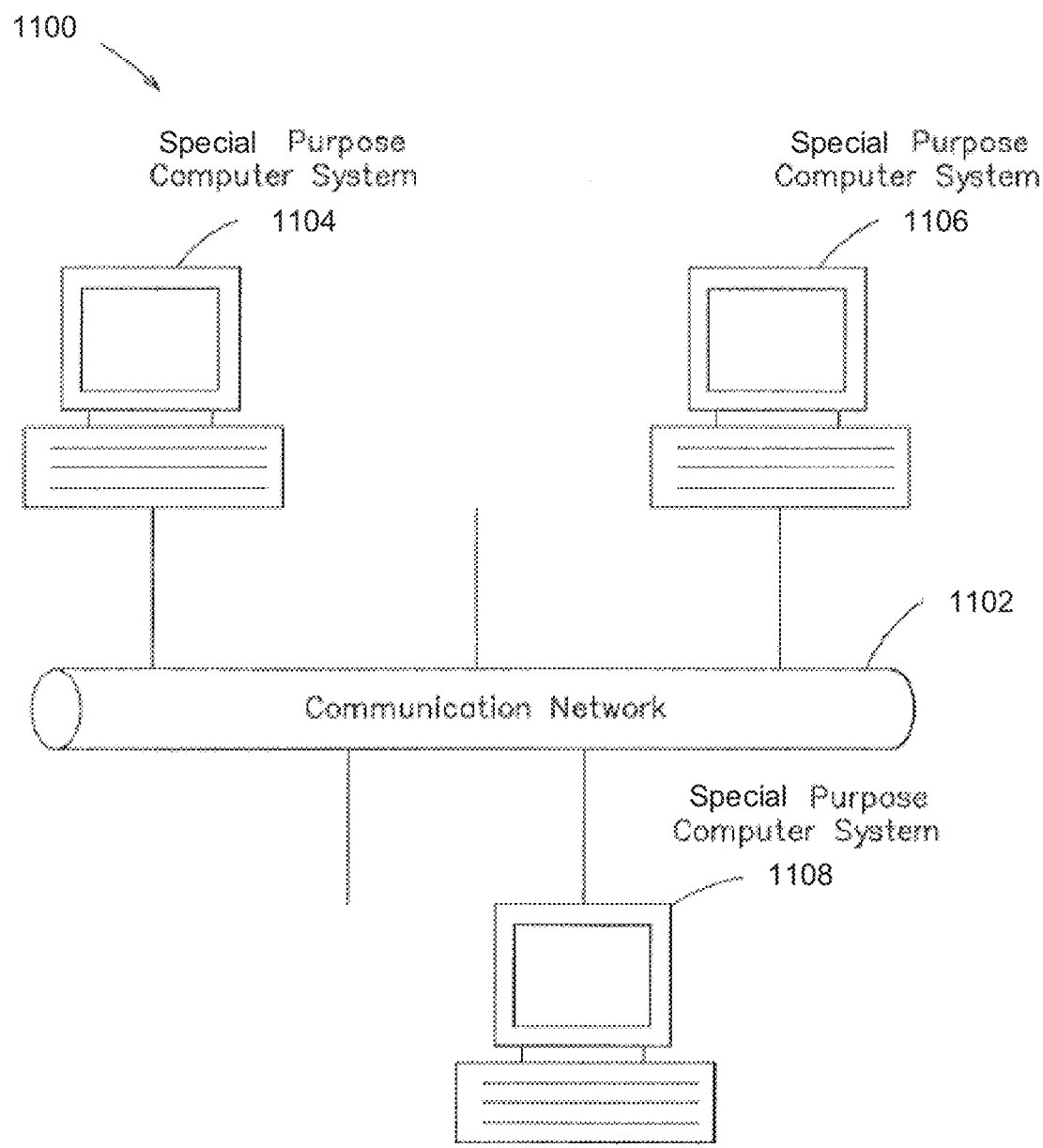
FIG. 11 is a block diagram of an example a distributed system, according to some embodiments.

The computer system may include specially-programmed, special-purpose hardware, for example, an application-specific integrated circuit (ASIC). Aspects of the invention can be implemented in software, hardware or firmware, or any combination thereof. Although computer system 1100 is shown by way of example, as one type of computer system upon which various aspects of the invention can be practiced, it should be appreciated that aspects of the invention are not limited to being implemented on the computer system as shown in FIG. 11. Various aspects of the invention can be practiced on one or more computers having a different architectures or components than that shown in FIG. 11.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C #(C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 1100 shown in FIG. 11. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. One such distributed network, as discussed below with respect to FIG. 8, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 11 shows an architecture diagram of an example distributed system 1100 suitable for implementing various aspects of the invention. It should be appreciated that FIG. 11 is used for illustration purposes only, and that other architectures can be used to facilitate one or more aspects of the invention.

System 1100 may include one or more specially configured special-purpose computer systems 1104, 1106, and 1108 distributed among a network 1102 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

CONCLUSION

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A database system comprising:
   a database comprising at least one data storage node;
   at least one processor configured to execute a plurality of system components, wherein the system components comprise:
      an interface component configured to receive a multi-document transaction comprising:
         a first operation configured to perform a first modification of first data of a first document stored in the database; and
         a second operation configured to perform, in association with the first operation, a second modification of second data of a second document stored in the database, the second data of the second document being at least partially different than the first data of the first document,
         wherein the first modification and the second modification relate the first data of the first document to the second data of the second document;
      a transaction processing component configured to:
         perform at least part of the multi-document transaction on the database, comprising performing the first operation on the first document;
         determine whether an error occurred in performing the at least part of the multi-document transaction; and
         responsive to determining that the error occurred in performing the at least part of the multi-document transaction, reverse the first operation performed on the first document associated with the multi-document transaction using a transaction identifier.

2. The database system of claim 1, wherein:
   the system components further comprise a transaction identification component configured to generate the transaction identifier, the transaction identifier being associated with the multi-document transaction; and
   the transaction processing component is further configured to associate the first operation and the second operation of the multi-document transaction with the transaction identifier.

3. The database system of claim 1, wherein the transaction processing component is further configured to, responsive to determining that the error did not occur in performing the at least part of the multi-document transaction, output a confirmation.

4. The database system of claim 1, wherein the at least one processor comprises a plurality of processors including:
   a first processor configured to execute a transaction identification component configured to generate the transaction identifier, the transaction identifier being associated with the multi-document transaction; and
   a second processor configured to execute the transactions processing component.

5. The database system of claim 4, wherein the transaction identification component is configured to transmit the first operation and the second operation and the transaction identifier to the second processor.

6. The database system of claim 1, wherein the transaction processing component is configured to perform at least part of the multi-document transaction at least in part by performing at least part of the first operation and the second operation on a primary data storage node of the at least one data storage node and triggering at least one secondary data storage node of the at least one data storage node to replicate the at least part of the first operation and the second operation.

7. The database system of claim 1, wherein the transaction processing component is configured to associate the first operation and the second operation with the transaction identifier at least in part by storing a relationship between each of the first operation and the second operation and the transaction identifier.

8. The database system of claim 7, wherein the transaction processing component is configured to reverse the first operation performed on the first document at least in part by identifying the first operation using the stored relationship and reversing the identified first operation.

9. The database system of claim 1, wherein the transaction processing component is configured to determine whether the error occurred in performing at least part of the multi-document transaction comprises determining whether an error occurred in performing the first operation for the multi-document transaction.

10. The database system of claim 1, wherein the database follows an eventual consistency model.

11. The database system of claim 10, wherein the at least one data storage node comprises a primary data storage node including an operation log and at least one secondary data storage node configured to retrieve the operation log and replicate operations in the operation log.

12. The database system of claim 11, wherein the transaction processing component is configured to perform at least part of the multi-document transaction at least in part by writing at least part of the first operation and the second operation to the operation log.

13. The database system of claim 1, wherein the transaction processing component is further configured to, responsive to determining that the error did not occur in performing the at least part of the multi-document transaction, perform the second operation on the second document.

14. The database system of claim 1, wherein:
  determining whether an error occurred in performing the at least part of the multi-document transaction comprises:
    determining that the error occurred in performing the second operation on the second document to relate the first data of the first document to the second data of the second document;
  responsive to determining that the error occurred in performing the at least part of the multi-document transaction, reversing the first operation performed on the first document comprises:
    responsive to determining that the error occurred in performing the second operation on the second document to relate the first data of the first document to the second data of the second document, reverse the first operation performed on the first document.

15. A method of performing operations in a database comprising at least one data storage node, the method comprising:
  receiving, by an interface component executed by at least one processor, a multi-document transaction comprising:
    a first operation configured to perform a first modification of first data of a first document stored in the database; and
    a second operation configured to perform, in association with the first operation, a second modification of second data of a second document stored in the database, the second data of the second document being at least partially different than the first data of the first document,
    wherein the first modification and the second modification relate the first data of the first document to the second data of the second document;
  performing, by the transaction processing component, at least part of the multi-document transaction on the database, comprising performing the first operation on the first document;
  determining, by the transaction processing component, whether an error occurred in performing the at least part of the multi-document transaction; and
  reversing, by the transaction processing component, the first operation performed on the first document associated with the multi-document transaction using a transaction identifier responsive to determining that the error occurred in performing the at least part of the multi-document transaction.

16. The method of claim 15, further comprising performing the at least part of the multi-document transaction at least in part by performing at least part of the first operation and the second operation on a primary data storage node of the at least one data storage node and triggering at least one secondary data node of the at least one data storage node to replicate the at least part of the first operation and the second operation.

17. The method of claim 15, further comprising associating the first operation and the second operation with the transaction identifier at least in part by storing a relationship between each of the first operation and the second operation and the transaction identifier.

18. The method of claim 17, further comprising reversing the first operation performed on the first document at least in part by identifying the first operation using the stored relationship and reversing the identified first operation.

19. The method of claim 15, wherein determining whether the error occurred in performing the at least part of the multi-document transaction comprises determining whether the multi-document transaction ends with a commit operation to replicate the first operation and the second operation in the transaction from a first data storage node in the at least one data storage node to at least one other data storage node in the at least one data storage nodes.

20. At least one non-transitory computer-readable storage medium storing instructions that, when executed by a processor, cause the processor to perform acts of:
  receiving a multi-document transaction comprising:
    a first operation configured to perform a first modification of first data of a first document stored in the database; and
    a second operation configured to perform, in association with the first operation, a second modification of second data of a second document stored in the database, the second data of the second document being at least partially different than the first data of the first document,
    wherein the first modification and the second modification relate the first data of the first document to the second data of the second document;
  performing at least part of the multi-document transaction on the database, comprising performing the first operation on the first document;
  determining whether an error occurred in performing the at least part of the multi-document transaction; and
  reversing the first operation performed on the first document associated with the multi-document transaction using a transaction identifier responsive to determining that the error occurred in performing the at least part of the multi-document transaction.

* * * * *